United States Patent
Katsuda

(10) Patent No.: US 7,168,734 B2
(45) Date of Patent: Jan. 30, 2007

(54) INFLATOR FOR AIR BAG

(75) Inventor: Nobuyuki Katsuda, Himeji (JP)

(73) Assignee: Daicel Chemical Industries, Ltd., Sakai (JP)

( * ) Notice: Subject to any disclaimer, the term of this patent is extended or adjusted under 35 U.S.C. 154(b) by 337 days.

(21) Appl. No.: 10/671,447

(22) Filed: Sep. 29, 2003

(65) Prior Publication Data

US 2004/0164535 A1   Aug. 26, 2004

Related U.S. Application Data

(60) Provisional application No. 60/416,883, filed on Oct. 9, 2002, provisional application No. 60/447,328, filed on Feb. 14, 2003.

(30) Foreign Application Priority Data

| Oct. 1, 2002 | (JP) | ............................ 2002-288574 |
| Feb. 7, 2003 | (JP) | ............................ 2003-030517 |

(51) Int. Cl.
   *B60R 21/207* (2006.01)
   *B60R 21/21* (2006.01)
   *B60R 21/26* (2006.01)
(52) U.S. Cl. .................... 280/730.2; 280/737; 280/740
(58) Field of Classification Search ................ 280/729, 280/730.2, 736, 737, 740–742
   See application file for complete search history.

(56) References Cited

U.S. PATENT DOCUMENTS

| 3,836,167 A | 9/1974 | Wilson |
| 5,273,312 A | 12/1993 | Coultas et al. |
| 5,542,702 A | 8/1996 | Green et al. |
| 5,564,743 A * | 10/1996 | Marchant ..................... 280/741 |
| 5,794,973 A | 8/1998 | O'Loughlin et al. |
| 5,863,066 A * | 1/1999 | Blumenthal ................. 280/737 |
| 5,934,705 A * | 8/1999 | Siddiqui et al. ............. 280/736 |
| 6,039,348 A | 3/2000 | Niederman et al. |
| 6,062,599 A * | 5/2000 | Forbes et al. ................ 280/737 |
| 6,095,561 A * | 8/2000 | Siddiqui et al. ............. 280/742 |
| 6,123,355 A * | 9/2000 | Sutherland ............... 280/728.2 |
| 6,349,964 B1 | 2/2002 | Acker et al. |
| 6,820,898 B2 * | 11/2004 | Dinsdale et al. ............ 280/737 |

FOREIGN PATENT DOCUMENTS

| JP | 5-201304 A | 8/1993 |
| JP | 2000-177527 A | 6/2000 |
| JP | 2001-347915 A | 12/2001 |
| JP | 2002-114126 A | 4/2002 |
| WO | WO 97/08020 A1 | 3/1997 |
| WO | WO 97/32753 A | 9/1997 |

* cited by examiner

*Primary Examiner*—Paul N. Dickson
*Assistant Examiner*—Laura B Rosenberg
(74) *Attorney, Agent, or Firm*—Birch, Stewart, Kolasch & Birch, LLP

(57) ABSTRACT

An inflator for a side collision allows adjustment of an inflation condition for an air bag according to a variety of builds of passengers and reduction of size. Gas discharging ports are provided at both sides with regard to an axial direction of an inflator having two igniters, and a total opening area of gas ejecting ports formed at one side is made different from a total opening area of gas ejecting ports formed at the other side.

18 Claims, 12 Drawing Sheets

INFLATOR FOR AIR BAG

CROSS-REFERENCE TO RELATED APPLICATIONS

This Nonprovisional application claims priority under 35 U.S.C. § 119(e) on U.S. Provisional Application Nos. 60/416,883 and 60/447,328 filed on Oct. 9, 2002 and Feb. 14, 2003, respectively; and under 35 U.S.C. § 119(a) on Patent Application Nos. 2002-288574 and 2003-30517 filed in Japan on Oct. 1, 2002 and Feb. 7, 2003, respectively; the entire contents of which are hereby incorporated by reference.

BACKGROUND OF THE INVENTION

The present invention relates to an inflator for an air bag whose stability at the time of activation is improved, and, in particular, to an inflator for a side collision in which a developing pattern or the like can be adjusted finely according to a variety of physical builds of passengers (a difference in overall height, a variety of heights, sitting heights or the like).

DESCRIPTION OF THE RELATED ART

As an inflator for an air bag mounted to such a vehicle as an automobile, there have been provided various inflators including an inflator for a driver side, an inflator for a passenger side, an inflator for a side collision, an inflator for a curtain air bag, an inflator for a pretensioner and the like according to their mounting positions, their objects and the like.

Among them, the inflator for a side collision is used in an air bag system (an air bag system for a side collision) for improving safety at the time of side collision of a vehicle, and it is mounted to a seat back or the like in many cases. The side air bag system has been conventionally provided as one for mainly reducing damage to the breast of a passenger at the time of side collision. In recent years, however, inflators for protecting the head and the chest of a passenger, or the chest and the hip thereof have been provided as well.

However, since an air bag mounted to an inflator for a side collision which is currently provided is a single bag body which does not have any partition therein, it is difficult to achieve an optimal protection corresponding to a variety of physical builds of passengers (particularly, a variety of heights, sitting heights or the like). That is, in case of protecting the chest or the head of a short passenger, it is necessary to mount an air bag for a side collision at a low position in a seat back or the like. On the other hand, it is necessary to mount an air bag at a high position in order to protect the head or the chest of a tall passenger. In order to accommodate these conditions with one airbag, a considerably large air bag is required. As a result, an inflator with a large size which can discharge a large amount of gas sufficient for allowing inflation of the large air bag is forced to be used. Further, even if only one air bag is used, an inflated air bag becomes thick. In a compartment of a vehicle, since a clearance between a door panel of the vehicle and a passenger is small, it is easily expected that, when the thick air bag is inflated inside this small clearance, an impact acting on the passenger may become large. In particular, when an armrest is provided on the door panel, which is a structure projecting towards a passenger, the clearance between the door panel and the passenger becomes even smaller.

On one hand, however, there is also a limitation regarding an arrangement position of an inflator for a side collision air bag. For this reason, a huge sizing of an inflator volume causes a problem about an installation place or the like.

Therefore, with regard to such specialty of the inflator for a side collision that an air bag is inflated in the vertical wide range in a vehicle to protect the head and chest or the chest and hip of the passenger, an inflator for side collision in which a developing condition can be adjusted according to a variety of builds of passengers and that can be made compact is demanded.

However, in an inflator for a side collision which is currently provided, only one igniter is used for starting activation, as shown in, for example, US-B 5542702 and the like, and an inflation condition of the air bag can not be changed optionally, because a discharge condition of a gas discharged by activation of the igniter is specified unambiguously.

As an inflator where a discharge condition of a gas can be adjusted at the time of activation, there has been proposed one (a dual type inflator) where activations of two igniters are adjusted, as shown in, for example, U.S. Pat. No. 6,039,348 and the like. However, a conventional inflator is to be mounted in the passenger side and is not include the specialty of the inflator for a side collision (such a specialty that an air bag is inflated in the vertical wide range to protect the head and chest or the chest and hip of the passenger), and thereby, the conventional inflator cannot be directly applied to the inflator for a side collision. That is, even if this inflator is applied to an inflator for a side collision, since such a constitution is not changed that a gas is ejected into one air bag and a developing pressure of the whole air bag is merely changed, an optimal protection according to the physical build of the passenger can not be achieved. Further, the content of the disclosure in the same publication includes a proper use of either one of the igniters according to the magnitude of an impact, but does not include the art for varying an inflating portion according to a size of the passenger.

Further, in U.S. Pat. No. 5,794,973 (in particular, FIG. 10 in the document), such an inflator is shown that an internal space is partitioned into two chambers by providing a partition member at the center in a housing and igniters and propellants are disposed at end portions of the respective chambers, and gas discharging ports which are different in opening and a communication hole connecting both chambers to each other are formed in the partition member. However, also this inflator feeds a gas into a single air bag and changes only a developing pressure, hardly realizing the optimal protection according to a build of a passenger. Further, the inflator shown in FIG. 10 of U.S. Pat. No. 5,794,973 is provided with gas discharging ports at the central portion of the housing and these ports are directed in directions contrary to each other on a circumference of a circle. Therefore, even if respective gas discharging ports and respective air bags (or conduits connected to the air bags) are connected, a structure therefore is complicated and it is difficult to incorporate the structure into an inflator for a side collision, which is restrained spatially. Further, in order to protect the head or the chest of a passenger, or the chest or the hip thereof by one air bag, a bag itself becomes large (it becomes long vertically). On one hand, in the air bag system for a side collision, since a vehicle space (for example, a side portion of a seat back or the like) for mounting the air bag system is limited and a space where a vertically long bag is folded and accommodated is limited, and it takes time to fill a gas into a bag completely at the time of development, it is expected that a passenger protection to a collision is too late.

Furthermore, when a vehicle (called a "vehicle A") provided with an air bag and another vehicle (vehicle B) collide against each other, a protruded portion (for example, a bumper, a distal end portion of a hood or the like) of the vehicle B deforms the body of the vehicle A. At this time, according to the height of the vehicle A (strictly speaking, a height of a sitting surface of a seat from the ground) or a position of the protruded portion of the vehicle B (strictly speaking, a height of the bumper or the distal end portion of the hood from the ground), a problem occurs about which portion of a passenger in the vehicle A the air bag hits first. For example, when the vehicle B collides to a side of the vehicle A with a short height (a height of a seat from the ground is short), or when the height of the vehicle A is not short but a vehicle with a tall height (for example, a pickup truck) collides against a side of the vehicle A, the side of the body of the vehicle A deforms and a portion of the vehicle A corresponding to the protruded portion of the vehicle B exists at an upper portion of a passenger, so that the portion hits the passenger in the vehicle at first. Therefore, in the conventional air bag system, there has not been a sufficient consideration about the height of the vehicle (the height of a seat), which portion of a vehicle is damaged, or which portion of a passenger should be protected preferentially according to the physical build of the passenger.

Further, gas generating apparatuses provided with a casing fitted on an inflator and the like have conventionally been proposed (JP-A 2002-114126, JP-A 5-201304 and JP-A 2001-347915). However, the apparatuses proposed in JP-A 2002-114126 and JP-A 5-201304 employ such a constitution that gas jetting ports are provided in the vicinity of a center of a casing in an evenly dispersed manner, and the apparatus proposed in the JP-A 2001-347915 employs such a constitution that a gas is simply introduced in the axial direction of an inflator main body. The apparatuses proposed in JP-A2002-114126, JP-A5-201304 and JP-A2001-347915 are constituted to inflate one air bag exclusively, and they are not suitable for inflating two air bags or sections of an air bag independently. Further, in these prior arts, even an idea for achieving an optimal protection according to the physical build of a passenger is not proposed.

Moreover, a side impact protecting apparatus of a gas bag system shown in JP-A 2000-177527 also has been conventionally proposed. Explanation about the protecting apparatus will be made on the basis of FIGS. 1 and 2 of this document. In the protecting apparatus, a tubular housing 30 is mounted to an outside of a cylindrical gas generator 36, inflow opening portions 42 and 44 for feeding gases into respective chambers (air bags) 20 and 22 comprising two rooms completely divided by a division seam are formed in the tubular housing, and a gas generated from an outflow opening portion of the gas generator 36 is discharged into a space inside the tubular housing 30 to be fed from the opening portions 42 and 44 into the respective chambers (air bags) 20 and 22. Internal pressures of the chambers (air bags) 20 and 22 are made different from each other by making free sections of the opening portions 42 and 44 different from each other (in an example, a first chamber 20 is set to a pressure of 0.5 bar and a second chamber 22 is set to a pressure of 1.5 bar). In the protecting apparatus shown in FIG. 2 of this document, however, since a space formed by the gas generator 36 and the cylindrical housing 30 does not have the same width on a circumference of a circle, if the outflow opening portion 38 is disposed to abut on an inner face of a peripheral wall of the cylindrical housing 30, that is, if mounting is conducted in a state that a clearance is not formed between the outflow opening portion 38 and the cylindrical housing 30 or in a state that a width of the clearance is very small due to orientation of the mounting of the gas generator 36 on the circumference of a circle, or if the mounting is weak, it is expected that such an orientation change of the outflow opening portion 38 occurs due to vibrations of a vehicle or the like that the outflow opening portion 38 comes in contact with the inner wall of the peripheral wall of the cylindrical housing 30 or the outflow opening portion 38 is almost closed by the inner wall. In such a case, it becomes difficult to discharge a gas from the outflow opening portion 38, so that a desired air bag development can not be achieved.

SUMMARY OF THE INVENTION

The present invention provides an inflator for a side collision in which a developing condition of an air bag can be adjusted according to a variety of builds of passengers or a height (a height of a seat) of a colliding vehicle (or collided vehicle) with regard for such specialty of the inflator for a side collision that an air bag is inflated in the vertical wide range to protect the head and chest or the chest and hip of the passenger, and that can be made compact.

The present invention solves the above-described problem by an inflator having two igniters, narrow paths being provided on both sides with regard to the axial direction of the inflator and the narrow paths existing on the both sides being made different in flow path sectional area for a gas.

That is, the present invention is an inflator for an air bag, comprising:

a tubular inflator housing provided at both sides with regard to the direction thereof with opening portions;

diffuser portions mounted at both ends with regard to the axial direction of the inflator housing and are provided with a gas discharging port which discharges pressurized medium flowing out from the opening portions into an air bag;

rupturable plates which closes the respective opening portions of the inflator housing or any of the gas discharging ports to seal the pressurized medium inside; and igniters provided to correspond to the respective rupturable plates and rupture the rupturable plates, wherein narrow paths for regulating respective flow amounts of the pressurized medium are provided at both sides of the inflator housing, and a first gas flow path sectional area of either one of the narrow paths and a second gas flow path sectional area of the other narrow path are different from each other.

As the igniter constituting the inflator, a conventionally known electric igniter is used and it receives an ignition signal from external ignition signal outputting means upon activation. For electric connection between the ignition signal outputting means and each igniter, a bus system can be utilized. Then, the igniters can be provided inside the diffuser portions provided at both sides of the inflator housing with regard to the axial direction. Incidentally, a gas generating agent which is ignited and burnt by a flame generated by activation of the igniter can be provided in the vicinity of the igniter and between the igniter and the rupturable plate.

The rupturable plate closing either of the opening portions of the inflator housing or the gas discharging port is formed by using metal or the like adapted to be ruptured by activation of the igniter. The rupturable plate is ruptured by the igniter, so that a gas is discharged from the opening of the inflator housing and it is discharged from the gas discharging port. For rupturing the rupturable plate effectively, it is preferable that the igniter is disposed such that its portion which discharges a flame or energy by activation thereof is exactly opposite to and close to the rupturable plate.

As the pressurized medium charged into the housing, a known pressurized medium used in an inflator using a pressurized medium exclusively as a gas source for inflating an air bag, an inflator of a hybrid type or the like, for example, such a pressurized gas as argon or helium, nitrogen gas can be used.

The narrow paths which regulate a flow amount of pressurized medium are provided at both sides with regard to the axial direction of the inflator housing, and a gas flow path sectional area (A) of either one of the narrow paths and a gas flow path sectional area (B) of the other narrow path are made different from each other.

Such a narrow path refers to a portion whose flow path sectional area is narrowed for regulating the gas flow amount when the pressurized medium charged inside the inflator housing is discharged from each gas discharging port, and the flow path sectional area of a gas can be obtained as an area of a face orthogonal to a flow direction of a gas.

As the narrow paths, a plurality of gas discharging ports formed in each diffuser portion can be used. In this case, the total opening area of the gas discharging ports formed on one of the diffuser portions and the total opening area of the gas discharging ports on the other diffuser portion are made different.

As the narrow paths, the opening portions provided on both ends with regard to the axial direction of the inflator housing can be used. In this case, an opening area of the opening portion formed at one end of the inflator housing and an opening area of the opening portion formed at the other end of the inflator housing are made different from each other. Besides a case that the opening portion is formed by bending the end portion of the inflator housing in an inward flange shape, such a constitution may be employed that a washer-like ring member is provided at the end portion of the inflator housing and an inner hole thereof is utilized as the opening portion. Such a ring member may be fitted to a stepped portion provided in the end portion of the inflator housing, or it may be fixed in the diffuser portion provided at the end portion of the inflator housing.

Further, as the narrow paths, clearances formed between inner peripheral surfaces of the diffuser portions and outer peripheral surfaces of the igniters can be used. That is, the clearances are formed between the inner peripheral faces of the diffuser portions and the outer peripheral faces of the igniters by holding the igniters which rupture the rupturable plates insides each of the diffuser portions, and portions of the clearances from the opening portions to the gas discharging ports may be defined as the narrow paths. In this case, the minimum diametrical sectional area of the clearance between the inner peripheral surface of one diffuser portion and the outer peripheral surface of the igniter and the minimum diametrical sectional area of the clearance between the inner peripheral surface of the other diffuser portion and the outer peripheral face of the igniter are made different from each other.

By making the gas flow path sectional areas in the narrow paths different in this manner, the amounts of gases discharged from the respective gas discharging ports are regulated, so that the gas passes through the narrow path having the larger flow path sectional area and the gas is discharged preferentially from the diffuser portion (in fact, the gas discharging port) in which the narrow path having the larger flow path sectional area is formed. Thereby, it is made possible to adjust the discharge amount of a gas from each gas discharging port optionally. By adjusting activation timings of the igniters, the discharge condition of a gas from each gas discharging port can be adjusted optionally.

Regarding the gas flow path sectional areas in the narrow paths which are different in the axial direction of the inflator housing, a ratio of a small gas flow path sectional area (A): a large gas flow path sectional area (B) is in the range of 1:1 to 1:6, preferably in the range of 1:1.3 to 1:5, and further preferably in the range of 1:1.5 to 1:4. By setting the ratio of (A): (B) in this manner, the discharge condition of a gas can be adjusted more preferably.

In the inflator of the present invention, since the diffuser portions are provided at the end portions with regard to the axial direction of the inflator housing, individual and independent air bags or individual and independent gas introducing ports provided in one air bag are easily and securely coupled to the respective diffuser portions.

By using the above-described in flat or, an airbag system of the present invention described below can easily be formed.

An air bag system according to the present invention is one formed with the above-described inflator and an air bag, thereby solving the above-described problem.

An air bag used in the air bag system of the present invention may be one airbag (bag body) which is formed with different gas introducing ports (namely, a first gas introducing port and a second gas introducing port) connected to the respective diffuser portions, and it may comprise a plurality of air bags, the different air bags being connected to the respective diffuser portions. Accordingly, in the inflator for an air bag according to the present invention, gases discharged from the respective diffuser portions each inflate different air bag portions (the former aspect) or the air bags (the latter aspect).

In particular, when an air bag which has a plurality of gas introducing ports, the respective gas introducing ports being connected to different diffuser portions is used, it is desirable that an inner space of the air bag is partitioned into a space connected to a first gas introducing port and a space connected to a second gas introducing port and these spaces are partially in communication with each other. By partitioning the inner space of the air bag, air bag portions (namely, partitioned air bag chambers) can be inflated independently for respective gases flowed in from the respective introducing ports. In particular, in an air bag for a side collision, when the head and the chest of a passenger, or the chest and the hip thereof are protected over a broad range by one air bag, it is necessary to make the size of a bag large and increase an amount of a gas generated. Further, since a clearance between a side structure (for example, a door or the like) of a vehicle and a passenger becomes narrow, when a bag is made large, the thickness of the bag is also made thick at the time of development, so that, when such a bag is developed between the vehicle side structure and the passenger, an impact acting on the passenger becomes large. Thereby, by partitioning the inner space at a portion regarding a vertical length of the bag (for example, joining clothes of the bag and so on), the thickness of the bag in its transverse direction can be made thin, the volume inside the bag can be prevented from being made large unnecessarily, and it is possible to suppress an influence on a passenger at the time of development. By putting two spaces in communication with each other at a portion, a gas communication inside the air bag is made inside the air bag. As a result, the internal pressure in one air bag portion can be prevented from being raised excessively.

In the inflator used in the air bag system, the narrow paths which each regulate flow amounts of the pressurized medium are provided at both sides with regard to the axial direction of the inflator housing and an output or a discharge amount of a gas between the gas discharging ports existing at the end portions with regard to the axial direction is adjusted by making both the narrow paths different in gas flow path sectional area, so that an inflator for an air bag where inflating conditions of respective air bags or air bag portions (air bag chambers) can be adjusted according to which diffuser portion is connected to the air bags or the air bag portions can be achieved. That is, considering such a specialty of the inflator for a side collision that inflation is made over a broad range in a height direction in order to protect the head and chest of a passenger, or the chest and hip thereof, an inflator for a side collision where an inflation condition for an air bag can be adjusted according to a physical build (in particular, a height difference or a sitting height difference) of a passenger and reduction in size can be realized can be obtained. Further, at the time of a side collision where the inflator for a side collision functions, a space allowing absorption of an impact energy is small as compared with a front collision and the air bag must be developed for a shorter time. However, by adjusting an output and a discharge amount of a gas, a portion of the air bag which must develop more rapidly can be inflated selectively in a preferential manner.

In particular, when one diffuser portion of the two diffuser portions provided at both ends with regard to the axial direction of the inflator housing is coupled to an air bag or an air bag portion (air bag chamber) existing in the vicinity of an upper lateral part of a passenger (namely, in the vicinity of the head, or in the vicinity of the chest) and the other diffuser portion is connected to another air bag or another air bag portion existing in the vicinity of a lower lateral part of the passenger (namely, in the vicinity of the chest or in the vicinity of the hip), it is preferable that a gas flow path sectional area (A) of the narrow path formed at the side of the diffuser portion connected to the air bag or the air bag portion (air bag chamber) existing in the vicinity of the upper lateral part of the passenger is formed to be smaller than a gas flow path sectional area (B) of the narrow path formed at the side of the diffuser portion connected to the air bag or the air bag portion (air bag chamber) existing in the vicinity of the lower lateral part of the passenger. By increasing the ratio of the supply amount of a gas to the air bag or air bag portion corresponding to the lower portion of the passenger (namely, the air bag or the air bag portion protecting the breast or the hip of the passenger in this manner), an air bag system which can restrain both a short passenger and a tall passenger securely regardless of the height of the passenger can be achieved. By inflating the air bag or the air bag portion (air bag chamber) on the upper lateral part for a tall passenger additionally, the head of the passenger can further be protected securely.

For example, in a collision between vehicles of an ordinary height, when a passenger in a collided vehicle is an adult, a protruded portion of a colliding vehicle corresponds to a position of the hip of the passenger in the collided vehicle. Therefore, if the air bag corresponding to the lower portion (the hip) of the passenger is set to inflate preferentially, the passenger can be protected precisely. In order to inflate the air bag in this manner, for example, it is considered that the area of the opening discharging a gas into an air bag to be inflated preferentially is made large. On the other hand, when the height of a colliding vehicle is high under such a situation, a protruded portion of the colliding vehicle corresponds to a position of the vicinity of the chest of a passenger of the collided vehicle. Even in this case, the smallness of the opening area can be compensated for by a timing of activation of the igniter for a bag to protect the chest of the passenger by developing the bag corresponding to the upper portion (the breast) of the passenger first (for example, first activating the igniter corresponding to the upper portion of the passenger). Therefore, determination is made by a sensor about which height portion of a vehicle is destroyed by a protruded portion of a colliding vehicle so that a bag positioned at a corresponding portion can be inflated preferentially. Further, when a passenger in the collided vehicle (a seat collided) is a child, the chest and the hip of an adult correspond to the vicinity of the head and the chest (or the hip) of the child, respectively. For this reason, a system which moderates an impact to a passenger and restrains the passenger firmly by controlling a timing for inflating each air bag optimally (namely, which igniter should be activated preferentially) according to a physical build of the passenger or the like such as a preferential inflation of a bag corresponding to the breast of the passenger so as not to impart an impact to the head of the passenger, when the passenger is a child, which is specially delicate can be achieved.

Further, if the inflator for a side collision of the present invention is provided in a vehicle having a low sitting position of a passenger, it is desirable that a gas flow path sectional area (A) of the narrow path formed at the diffuser portion connected to the air bag or the air bag portion (air bag chamber) around upper lateral part of the passenger is formed to be larger than a gas flow path sectional area (B) of the narrow path formed at the diffuser portion connecting to the air bag or the air bag portion (air bag chamber) existing in the vicinity of the lower lateral part of the passenger.

That is, at the time of a side collision of a vehicle, when a sitting position of a passenger in a collided vehicle is positioned at an average height of general automobiles (for example, the height of a seat from the ground is about 350 mm), inflations of the air bags or the air bag portions are made as described above. On the other hand, when the sitting position of the collided vehicle (for example, a sports car of the like) is lower than the average height in the ordinary automobiles (for example, the height of the seat from the ground is about 350 mm), a collided portion of the collided vehicle is eventually positioned in the vicinity of the head of the passenger in the collided vehicle or in the vicinity of his/her chest.

Therefore, when the inflator for a side collision is installed in such a vehicle having a low sitting position of a passenger (for example, a vehicle in which a height of a seat from the ground is in the range of 250 to 350 mm), it is desirable that the flow path sectional area (A) is formed to be larger than the flow path sectional area (B) and an air bag or an air bag portion (air bag chamber) existing at the collided portion in the vicinity of the head of the passenger or in the vicinity of the breast is inflated preferentially.

Further, in the above inflator, it is desirable that a partition plate developed in the diametrical direction is disposed inside the inflator housing to partition the interior of the housing into a first chamber and a second chamber, and a hole portion having a small gas flow path sectional area is provided in the partition plate. Desirably, the gas flow path sectional area of the hole portion is smaller than that of the narrow path having a smaller gas flow path sectional area between the narrow paths formed at both ends with regard to the axial direction of the inflator housing. By making formation in this manner, when one igniter is activated, all the pressurized medium existing in the housing is prevented from being concentrated on one air bag portion (air bag chamber) or one air bag at a time. After the pressurized medium in either one chamber flows into one air bag portion (air bag chamber) or one air bag, the pressurized medium in the other chamber gradually flows in the bag while its flow rate is being restricted by the hole portion, so that an impact to a passenger due to development of the air bag is moderated. Furthermore, by charging a gas into either one (a first chamber or a second chamber) of chambers partitioned in the housing, a gas can be charged into the other chamber (the second chamber or the first chamber) with an equal pressure.

Moreover, it is desirable that the interior of the inflator housing is partitioned by a partition plate having a hole portion and developing in the diametrical direction and the hole portion is closed by a closing member from the side including the narrow path having a larger gas flow path sectional area between the narrow paths formed at both sides with regard to the axial direction of the inflator housing. By making formation in this manner, when a gas is discharged from the diffuser portion having the narrow path with a larger gas communication area, the closing member is ruptured (or peeled off) due to a pressure difference between the chambers and all the gas in the housing is discharged into the air bag. However, when the gas is discharged from the diffuser portion having the narrow path with a smaller gas communication area the closing member is not ruptured (peeled off) even due to the pressure difference, so that only the gas in one portion of chambers is discharged into the air bag. That is, an inflator for an air bag where development condition of an air bag can be finely adjusted according to a physical build (particularly, a height or a sitting height of a passenger can be achieved. Further, after the pressurized medium in one chamber (a first chamber or a second chamber) defined in the housing is discharged, when the pressurized medium in the other chamber (the second chamber or the first chamber) is discharged from the same gas discharging port through the one chamber (the first chamber or the second chamber), the flow rate of the discharged gas can be adjusted by adjusting the opening area of the hole portion (namely, a flow rate adjusting function by the hole portion).

Further, in order to solve the above-described problem, the present invention provides an inflator for an air bag in which at least part of an inflator base portion is covered with a case portion provided with gas ejecting ports whose total opening areas are different at both sides with regard to the case portion.

That is, an inflator according to the present invention is an inflator for an air bag comprising an inflator base portion provided with an ignition means which receives an ignition current for activating the ignition means, an inflator housing and a gas discharging port which discharges a gas inside the inflator housing to the outside at the time of activation, and a tubular case portion which covers the entire or part of an outside of the inflator housing which includes to cover at least the gas discharging port, wherein gas ejecting ports are unevenly provided on a peripheral surface of the case portion at only both sides with regard to an axial direction of the case portion, and an inner space of the case portion is formed in a closed state such that the inner space is in communication with outside air through only the gas ejecting ports, a gas communication space which is an annular space having substantially a uniform width and guiding a gas discharged from the gas discharging port to the gas ejecting ports is secured between the inflator housing and the case portion, and in the gas ejecting ports provided at both sides of the case portion, a total opening area (A') of the gas ejecting port provided at one axial end portion is different from a total opening area (B') of the gas ejecting port provided at the other axial end portion.

In the inflator, when a gas inside the inflator is discharged from the gas discharging port at the time of activation, the gas passes through the gas communication space inside the case portion to be discharged from the respective gas ejecting ports formed at the axial both ends of the case portion. Since the respective total opening areas of the gas ejecting ports are different at both end portions with regard to the axial direction of the case portion, more gases are consequently discharged from the gas ejecting port having a larger total opening area, so that an air bag connected to the gas ejecting port having the larger total opening area can be inflated preferentially. For this reason, as shown concretely with the example of the case of a side collision between vehicles which have different sitting positions, when a seat position in a collided vehicle is set to an average height of general automobiles (for example, the height of the seat from the ground is about 350 mm), an air bag or an air bag portion (air bag chamber) positioned at a portion where the hip of a passenger is present can be inflated preferentially. Further, when the sitting position of the passenger in the collided vehicle (for example, a sports car or the like) is lower than the average height of general automobiles (for example, the height of the seat from the ground is about 350 mm), an air bag or an air bag portion (air bag chamber) at the head or the chest of a passenger (that is, a portion existing in the vicinity of an upper lateral part of the passenger) can be inflated preferentially. In particular, since the gas ejecting ports formed in the case are unevenly provided at both sides with regard to the axial direction of the case, connection to each air bag is made easy.

The case portion has an inflator base portion inside and is provided at only both sides, with regard to the axial direction, with gas ejecting ports unevenly, so that a gas generated from the inflator base portion is discharged from the respective gas ejecting ports. In the inflator for an air bag of the present invention, since the gas discharged into the air bags can be properly distributed by the case portion, a conventionally known inflator can be used as the inflator base portion. That is, an inflator which can be used as the inflator base portion may be one having one diffuser portion, one having one ignition means, or one where a pressurized gas is used as a gas source, a gas generating agent is used as the same or both of the pressurized gas and the gas generating agent are uses as the same.

The case portion is constituted such that an inner space of the case portion and outside air are in communication with each other only through the gas ejecting ports provided on both sides with regard to the axial direction of the peripheral face of the case portion, and for example, it can include a tubular case portion having one end closed in the direction thereof and the other end through which an inflator housing (an inflator base portion) is inserted into the case portion and which is closed, or a case portion in which an inflator housing are received and whose openings at both ends are fitted on the inflator housing and closed. In particular, the latter case has such a structure that part of the inflator housing (the inflator base portion) projects from the openings at both ends of the case portion, but such a structure can be employed in both the former case and the latter case that the whole of the inflator housing does not project from the opening at one end of the case portion or the opening at both the ends thereof.

This inflator has the case portion as an essential element, and it can be further defined in the following manner. That is, the present invention is an inflator for an airbag including an inflator housing having an opening portion, a diffuser portion which is provided at the opening portion of the inflator housing and is provided with a gas discharging port for discharging outside a gas flowed in from the opening portion and a tubular case portion which includes at least the diffuser portion and covers the whole or part of an outside of the inflator housing, wherein gas ejecting ports are provided on a peripheral face at axial both sides of the case portion; an inner space in the case portion is formed in a closed state where the inner space is in communication with outside air only through the gas discharging ports and a gas communication space for guiding a gas discharged from the gas discharging port into the gas ejecting ports is secured, and regarding the gas ejecting ports provided at the axial both sides of the case portion, a total opening area (A') of the gas ejecting port provided at either one end portion in the axial direction is different from a total opening area (B') of the gas ejecting port provided at the other end portion in the axial direction.

In the inflator of the above-described present invention, by forming the inflator base portion (the inflator housing) in a tubular shape, providing ignition means, which receives an ignition current for activating the ignition means, at one end of the inflator base portion, forming the case portion in a tubular shape in which its one end portion is closed and the other end portion is opened and bringing the opened end portion of the case portion in close contact with an outside of the inflator base portion (the inflator housing) to be closed, connection of the case portion and the inflator base portion (the inflator housing) is made easy. At that time, such a constitution can be employed that the gas discharging port is formed in the diffuser portion provided to the inflator housing and the diffuser portion is provided at the other end of the inflator housing.

By forming a recess portion on an outer peripheral surface of the inflator base portion (the inflator housing) and crimping and fixing the opened end portion of the case portion to the recess portion, connection of both can be easily and securely carried out. In this case, the recess portion is formed to make a round on the peripheral surface of the inflator base portion (the inflator housing), or alternatively, the recess portion may be formed on one portion of the periphery or intermittently.

In the gas ejecting ports provided at both sides with regard to the axial direction of the case portion, a total opening area (A') of the gas ejecting port provided at one end portion with regard to the axial direction is different from a total opening area (B') of the gas ejecting port provided at the other end portion, and it is desirable that the flow path sectional area of the gas communication space secured in the inner space of the case portion is formed larger than the smaller opening total area of the different total opening areas of the gas ejecting ports. In other words, it is desirable that the total opening area of at least one or both of the gas ejecting ports is smaller than the flow path sectional area of the gas communication space, and it is further desirable that each of the total opening areas of the gas ejecting ports is smaller than the flow path sectional area of the gas communication space. By making formation in this manner, the amount or the force of a gas flowing in the air bag can be adjusted by the gas ejecting ports formed at the case portion, so that adjustment of inflation condition of the air bag or change of the gas discharge amount can be made easy.

By arranging respective gas ejecting ports formed at both end portions with regard to the axial direction of the case portion in a circumferential direction, a propelling force due to a gas discharged at activation of the inflator can be cancelled so that a safety at the time of an erroneous activation can be secured reliably.

The inflator combined with an air bag to constitute an air bag system in the same manner as the inflator described above provided with the narrow paths for regulating the flow rate of the pressurized medium at both sides with regard to the axial direction of the inflator housing. The air bag system may be considered as constituted to include an air bag, an inflator for an air bag which inflates the air bag and a tubular case portion which covers the whole or part of an outside of the inflator for an air bag, and the case portion can be considered as a separate member or part of a module case which accommodates the air bag and the inflator. Regarding whether the case portion is considered as a constitution member for the inflator, a constitution member for the air bag system or an independent member, proper selection or change can be made according to circumstances on manufacture or the like.

At that time, such a constitution can be employed that, using an air bag having a first gas introducing port and a second gas introducing port, different gas introducing ports are connected to respective gas ejecting ports; different air bags are connected to respective gas ejecting ports; the total opening area (A') of the first ejecting port connected to an air bag portion (or an air bag) existing in the vicinity of an upper lateral part of a passenger is made smaller than the total opening area (B') of the second gas ejecting port connected to another air bag portion (another air bag) existing in the vicinity of a lower lateral part of a passenger; or conversely the former is made larger than the latter. In an air bag provided with two gas introducing ports, an inner space of the airbag is partitioned to correspond to the respective gas introducing ports and the partitioned inner spaces can be caused to communicate with each other at one portion.

According to the present invention, with regard for the specialty of an inflator for a side collision which vertically inflates over a broad range to protect the head and the chest of a passenger, an inflator for a side collision in which an inflation condition for an air bag can be adjusted according to a physical build of a passenger and reduction in size can further be achieved is provided.

DETAILED DESCRIPTION OF THE PRESENT INVENTION

Figure 1:
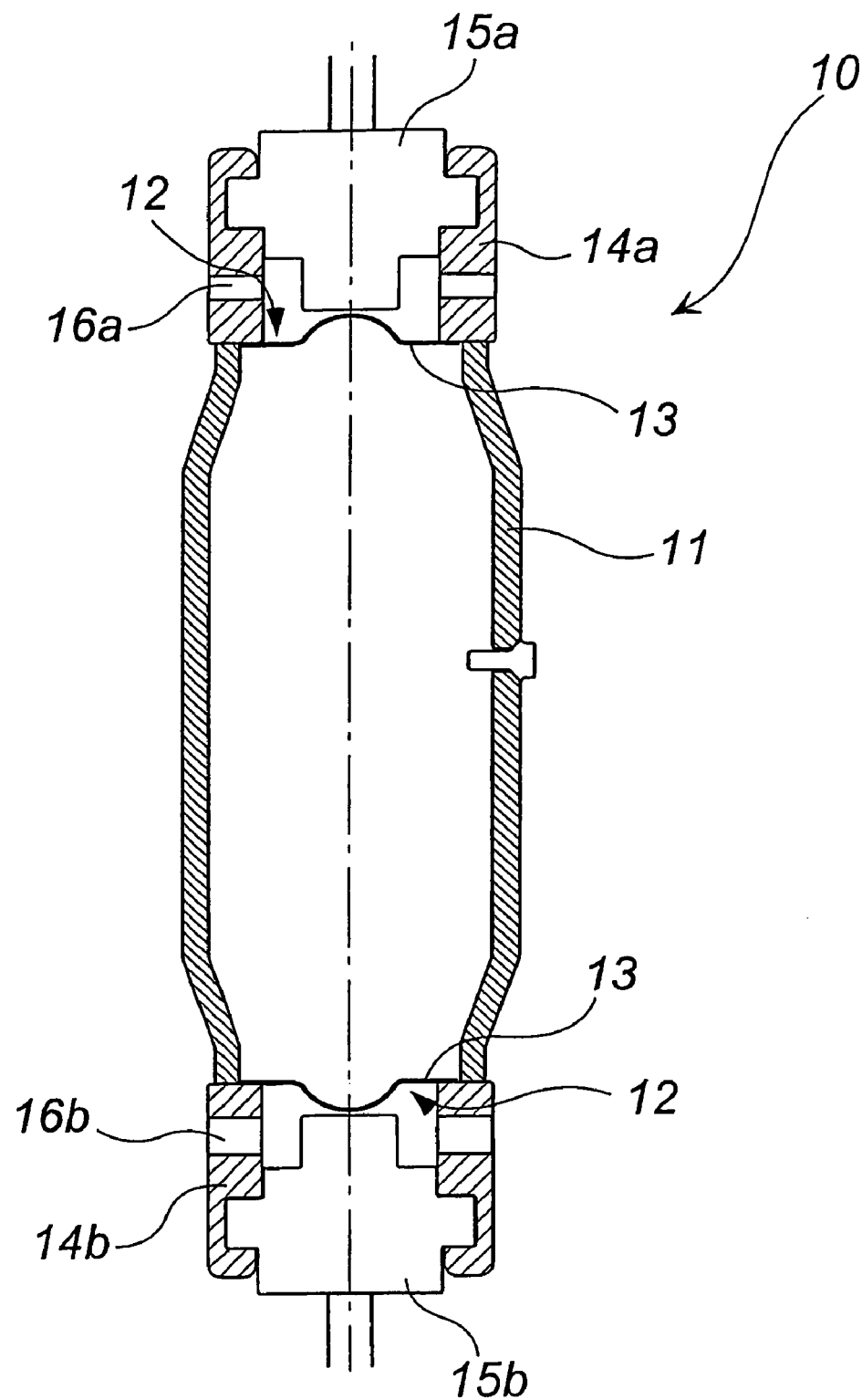
FIG. 1 is a sectional view with regard to an axial direction of an inflator.
Figure 2:
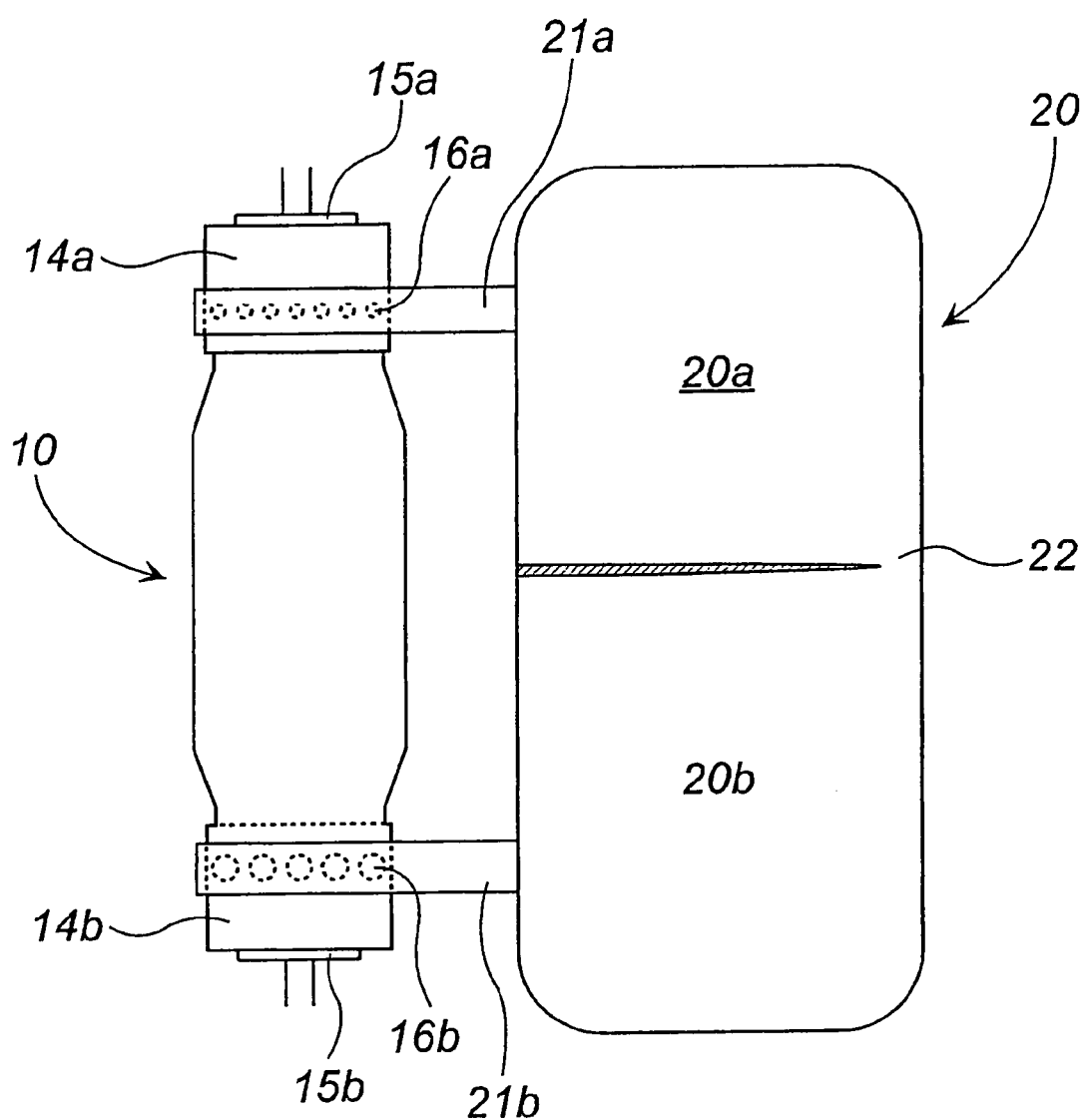
FIG. 2 is an enlarged schematic view of a main portion showing an air bag system.
Figure 3:
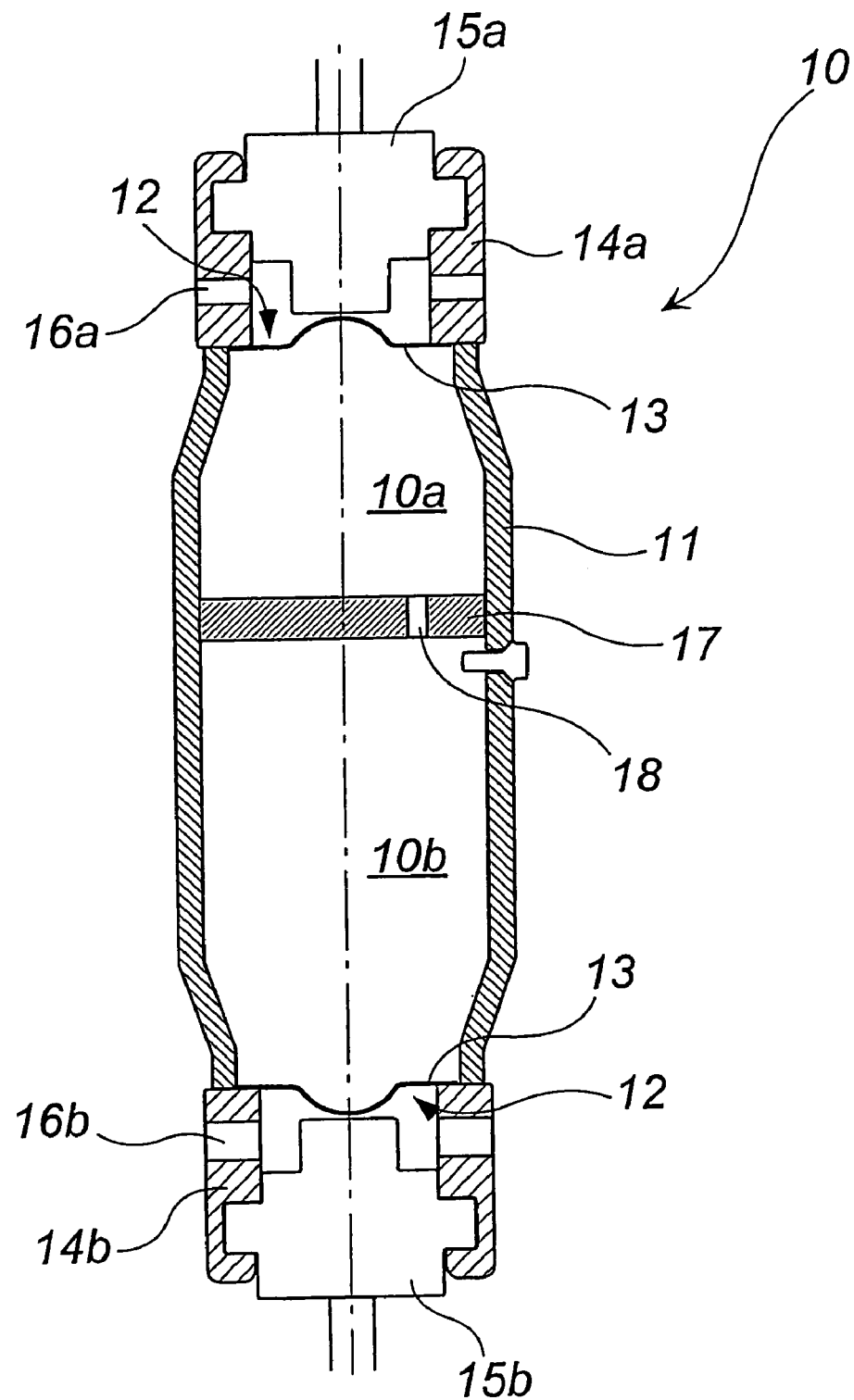
FIG. 3 is a sectional view showing another aspect of an inflator.
Figure 4:
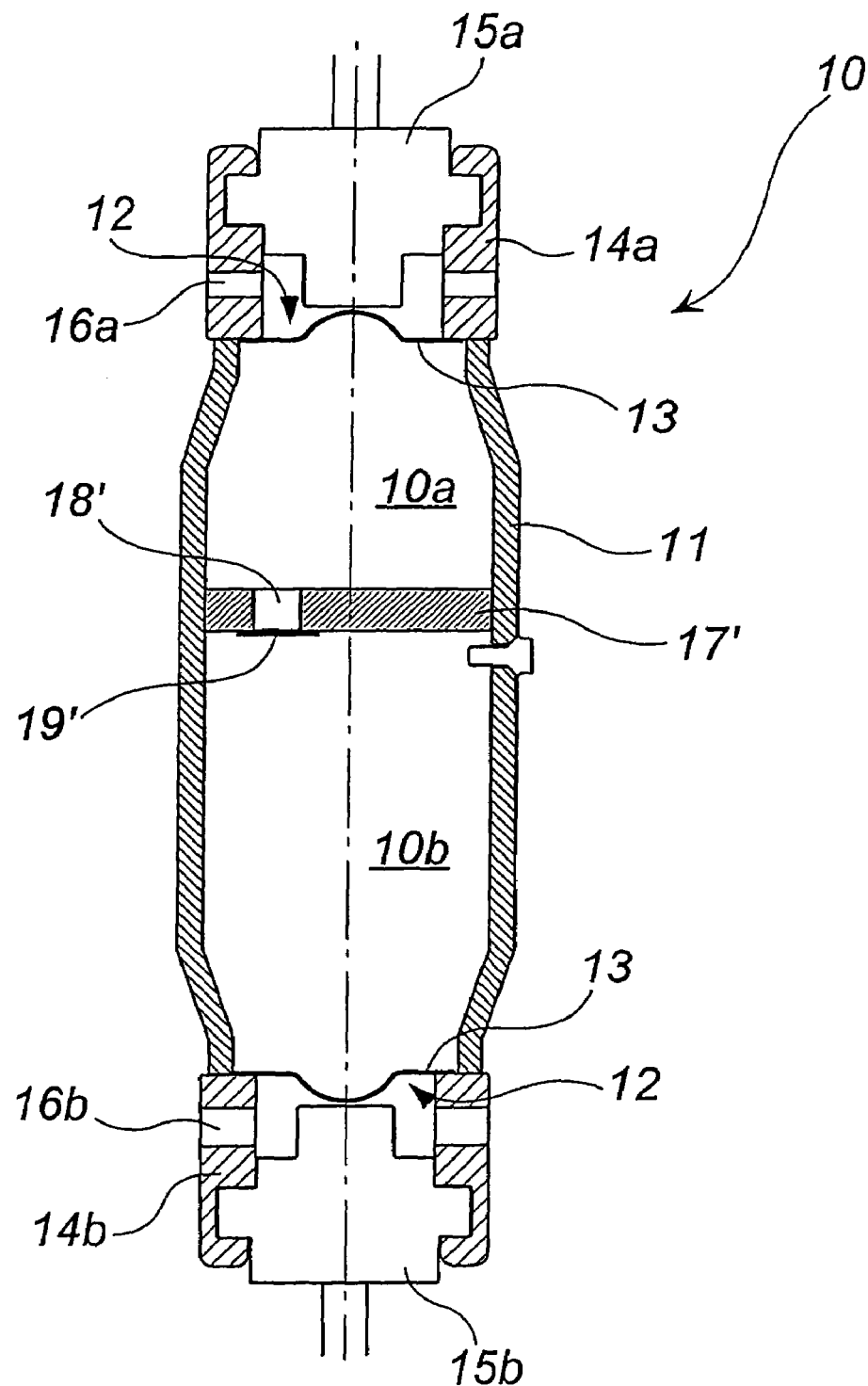
FIG. 4 is a sectional view showing still another aspect of an inflator.
Figure 10:
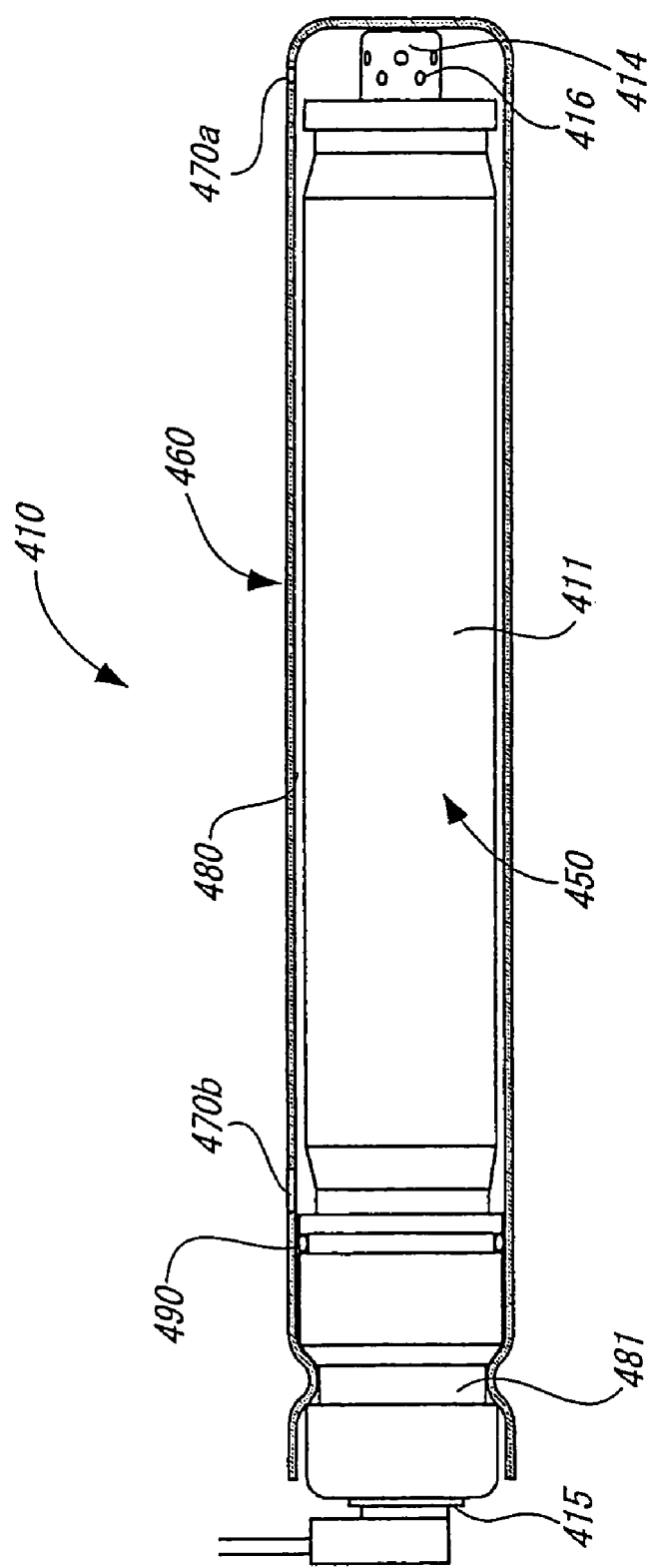
FIG. 10 is a sectional view showing still another aspect of an inflator.
Figure 11:
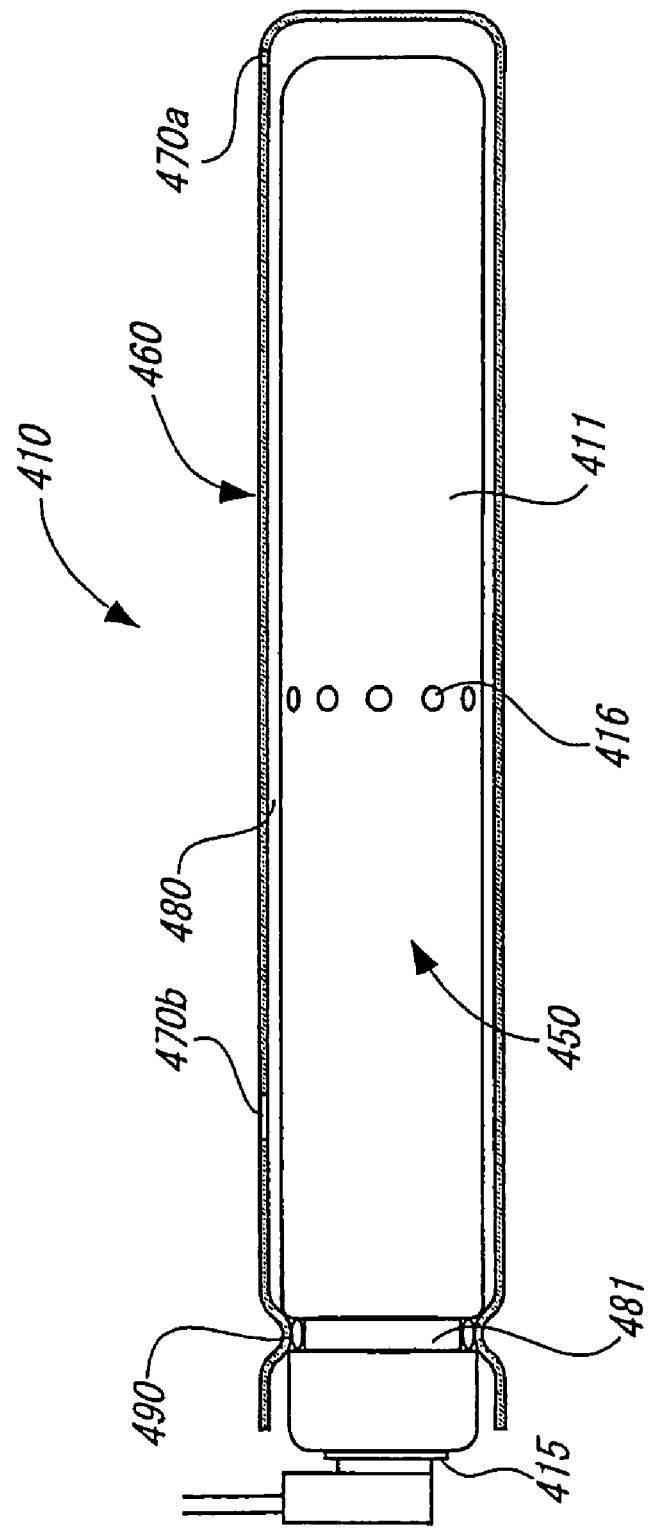
FIG. 11 is a sectional view showing still another aspect of an inflator.

Embodiments of the present invention will be explained with reference to the drawings. FIGS. 1, 3 and 4 are sectional views (along a longitudinal direction) showing a first embodiment of an inflator of the present invention, FIG. 2 is an enlarged schematic view of a main portion showing an air bag system using the inflator of the present invention, and FIGS. 5 to 9 are sectional views showing other embodiments of the inflator of the present invention. Further, FIGS. 10 and 11 are sectional views showing still other embodiments of the inflator of the present invention.

Embodiment 1

An inflator 10 shown in FIG. 1 is constituted by closing opening portions 12 at both ends of a tubular inflator housing 11 with rupturable plates 13 made of metal material, respectively, and charging a pressurized gas such as argon, helium or nitrogen gas into an inner space of the inflator housing 11.

The opening portions 12 of the inflator housing 11 closed with the rupturable plates 13 are connected to diffuser portions 14*a*, 14*b* having gas discharging ports 16*a*, 16*b*, and electric igniters 15*a*, 15*b* are enclosed and fixed in spaces in the diffuser portions 14*a*, 14*b*.

In this embodiment, the gas discharging ports 16*a* formed in the diffuser portions 14*a* are used as narrow paths. For this reason, the total area of the gas discharging port 16*a* formed in the diffuser portions 14*a* is different from that of the diffuser portions 14*b*.

In the following, for the sake of explanation of the embodiment, the gas discharging ports 16*a* which are formed to have a smaller total opening area are defined as first discharging ports 16*a* while the gas discharging ports which are formed to have a larger total opening area are defined as second discharging ports 16*b*. Further, the diffuser portion formed with the first gas discharging ports 16*a* is defined as a first diffuser portion 14*a* while the diffuser portion formed with the second gas discharging ports 16*b* is defined as a second diffuser portion 14*b*. Further, an igniter in the diffuser portion 14*a* is defined as a first igniter 15*a* while an igniter in the diffuser portion 14*b* is defined as a second igniter 15*b*.

Particularly, in this embodiment, the diameters of the first gas discharging ports 16*a* are made small and a total opening area (A) of the first gas discharging ports 16*a* is made smaller than a total opening area (B) of the second gas discharging ports 16*b*, as shown in the drawing, but such a constitution can be employed that the total opening area (A) is made smaller than the total opening area (B) by setting the diameters of the first gas discharging ports 16*a* and the second gas discharging ports 16*b* to be equal to each other and setting the number of the first gas discharging ports 16*a* to be fewer than the number of the second gas discharging ports, or by adjusting the diameters and the numbers of the respective ports.

In this embodiment, the number of the first gas discharging ports 16*a* is six, each having an inner diameter of 4 mm (which results in a total opening area of about 75.4 mm$^2$), and the number of the second gas discharging ports 16*b* is six, each having an inner diameter of 7 mm (which results in a total opening area of about 231 mm$^2$).

In the inflator 10 shown in this drawing, since the diffuser portions 14*a*, 14*b* formed with the gas discharging ports are provided at both ends of the inflator housing 11, such a constitution can be employed that different airbags 20 are connected to the respective diffuser portions 14 or introducing ports of a gas to the air bag 20 are varied. Since the total opening area (B) of the second gas discharging ports 16*b* is larger than the total opening area (A) of the first gas discharging ports 16*a*, the gas is preferentially discharged from the second diffuser portion 14*b* so that the second diffuser portion 14*b* can be clearly distinguished from the first diffuser portion 14*b* regarding the amount of gas discharge. Therefore, by adjusting activation timings of the respective igniters 15*a*, 15*b*, the amounts of gases discharged from the respective diffuser portions 14*a*, 14*b* can be adjusted finely.

Using the inflator 10 formed in this manner, an air bag system such as shown in FIG. 2 can be formed.

In many cases, the inflator 10 formed in this manner is installed, at the time of vehicle mounting, as an air bag system obtained by combining activation signal-outputting means comprising an impact sensor and a control unit, and a module case accommodating the above-described inflator 10 and an air bag 20 (a bag body). The air bag 20 (a bag body) is connected to the diffuser portions 14*a*, 14*b* at outer peripheral surfaces of the diffuser portions 14*a*, 14*b*.

Particularly, in the air bag system shown in FIG. 2, an air bag having two gas introducing ports 21*a* and 21*b* is used to introduce gases into the air bag 20 (a bag body), and respective spaces in an interior of the air bag are in communication with each other through a communication portion 22, but they are partitioned for respective introducing ports. The two gas introducing ports 21*a*, 21*b* are each connected to the different diffuser portions 14*a*, 14*b*, and, as shown in FIG. 2, the first diffuser portion 14*a* is connected to the first gas introducing port 21*a* and the second diffuser portion 14*b* is connected to the second gas introducing port 21*b*.

In the air bag system thus constituted, a space receiving a gas discharged from the second diffuser portion 14*b* (namely, a space connected to the second gas introducing port, which is hereinafter referred to as a "second air bag chamber 20*b*") inflates preferentially due to a difference in total opening area of the gas discharging ports. Therefore, when the second air bag chamber 20*b* is provided in the vicinity of the chest (a lower portion) of a passenger, in case of a tall passenger, his/her chest can be restrained and in case of a short passenger, his/her chest to head can be restrained, that is, an air bag system which can restrain a passenger securely regardless of his/her physical build can be achieved. A space receiving a gas discharged from the first diffuser portion 14*a* (namely, a space connected to the first gas introducing port, which is hereinafter referred to as a "first air bag chamber 20*a*") inflates additionally, thereby being capable of protecting a high portion of the passenger (for example, his/her head). By making the activation timings of the first igniter 15*a* and the second igniter 15*b* different, inflation timings and inflation conditions of the respective air bag chambers 20a and 20b can be adjusted optionally.

Incidentally, in addition to the above case, regarding the air bag 20 (the bag body), different independent air bags 20 can be provided to correspond to the respective diffuser portions 14. That is, an air bag which does not have a communicating portion (the communication portion 22) or an air bag where the air bag chamber 20a and the air bag chamber 20b are completely separated from each other can be employed in place of the air bag 20 shown in FIG. 2.

Regarding the inflator 10 for an air bag, it may alternatively be formed as shown in FIGS. 3 and 4.

That is, the inflator 10 shown in FIG. 3 is provided with a partition plate 17 extending in the radial direction in the housing 11, so that an inner space of the housing 11 is partitioned into two chambers. The partition plate 17 is formed with a hole portion 18 having an opening diameter smaller than that of the first gas discharging port 16a. For this reason, a first chamber 10a in the first diffuser portion 14a side of the partition plate 17 and a second chamber 10b existing in the second diffuser portion 14b side of the partition plate 17 are in communication with each other at the hole portion 18.

In the inflator 10 provided with the partition plate 17 having such a hole portion 18, even if only one igniter 15 is activated, a gas is never discharged at one time, so that, after a gas in one chamber is discharged, a gas in the other chamber is gently discharged through the hole portion 18. For example, when the second igniter 15b is activated, the gas in the second chamber 10b is rapidly introduced into the second air bag chamber 20b, but, while its flow rate is being regulated by the hole portion 18 with the small opening diameter, the gas in the first chamber 10a enters into the second chamber 10b, so that the gas is gently discharged from the second diffuser portion 14b to the second air bag chamber 20b. For this reason, when the second air bag chamber 20b exists at the chest of a passenger, an urgent bag development can be avoided so that a more effective restraint can be achieved.

Further, as shown in FIG. 4, it is desirable that an inner space in the housing 11 is partitioned by a partition plate 17' having a hole portion 18' to define a first chamber 10a and a second chamber 10b in the axial direction of the housing 11 and the hole portion 18' is closed by a closing member 19' from the diffuser portion 14 side having the larger total opening area of the gas discharging ports (that is, the second diffuser portion 14b side). By making formation in this manner, when the second igniter 15b is activated to discharge the gas in the second chamber 10b, the closing member 19' ruptures (or peels off) due to a pressure difference between both chambers, so that the gas in the first chamber 10a is also discharged from the second diffuser portion 14b. Therefore, when the second air bag chamber 20b exists at the chest of a passenger, the second air bag chamber 20b is inflated more sufficiently so that the passenger can be restrained further safely. On the other hand, even if the first igniter 15a is activated so that the gas in the first chamber 10a is discharged, since the closing member 19 is fixed by pressing from the second chamber 10b side, this member is not prevented from rupturing (or peeling off) due to a differential pressure so that only the gas in the first chamber 10a is introduced into the first air bag chamber 20a. At this time, the hole portion 18' may be formed to have a flow rate adjusting function as described above.

Embodiment 2

Figure 5:
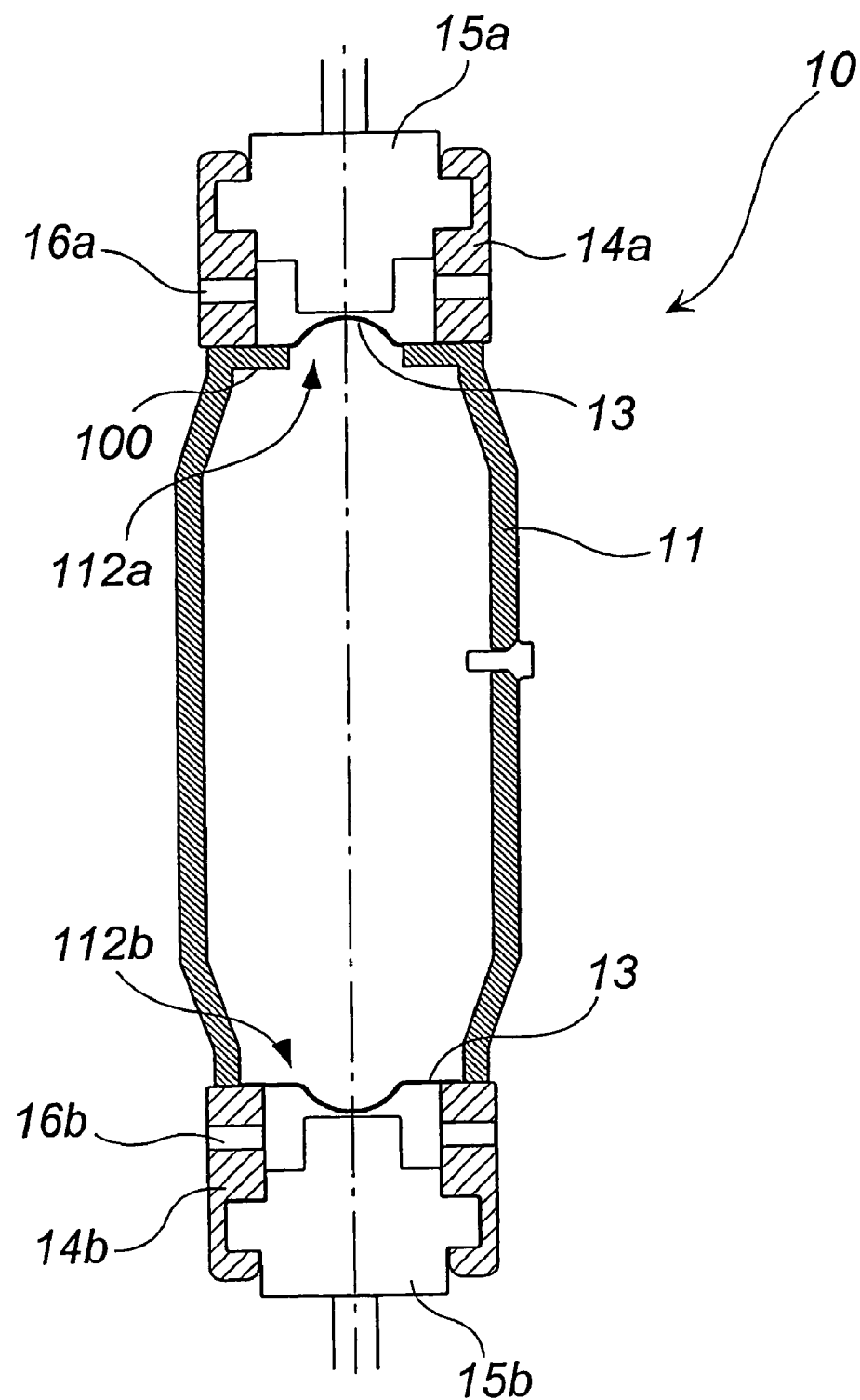
FIG. 5 is a sectional view showing still another aspect of an inflator.

An inflator for an air bag of the aspect shown in FIG. 5 is different from the above inflator for an air bag shown in FIG. 1 particularly regarding then arrow paths. Since the other portions of the former are almost the same as those of the above inflator shown in FIG. 1, the same reference numerals are used in the drawing and explanation thereof will be omitted. Incidentally, in this embodiment, the first gas discharging ports 16a and the second gas discharging ports 16b may be the same in the diameter or the same number of the opening portions, and signs (a and b) for distinguishing the first and the second from each other are used only in view of convenience for explanation.

The inflator shown in this FIG. 5 has opening portions 112a, 112b formed at both ends of an inflator housing as narrow paths, and an outflow amount (an outflow speed) of a pressurized medium can be adjusted by changing the opening areas of the respective opening portions 112a and 112b. That is, in this embodiment, one end side or both end sides of the housing is formed as an inward flange-like flange portions 100, and a central opening of the flange portion and an end opening of the inflator housing are formed as opening portions 112a and 112b.

In the case where the opening areas of the opening portions 112a and 112b are made different, the gas discharging ports 16a and 16b formed at the respective diffuser portions 14a and 14b are formed to have the same opening diameter and the same number of the opening portions (that is, the total opening areas are the same). Incidentally, since the amounts of the gases discharged from the respective diffuser portions 14a and 14b or the like are controlled by the opening portions 112a and 112b formed at the flange portion 100 and the end portion of the inflator housing, the total opening areas of the respective gas discharging ports 16a and 16b formed at the respective diffuser portions 14a and 14b need to be made larger than the opening areas of the opening portions 112a and 112b.

Even in the inflator shown in this embodiment, the amounts of the gases discharged from the respective diffuser portions 14a and 14b (in fact, the respective gas discharging ports 16a and 16b) can be finely adjusted optionally by adjusting the activation timings of the respective igniters 15. For this reason, when the air bag system of the present invention is formed using the inflator, inflation timings and inflation conditions of the respective air bag chambers 20a and 20b can be adjusted optionally.

Figure 6:
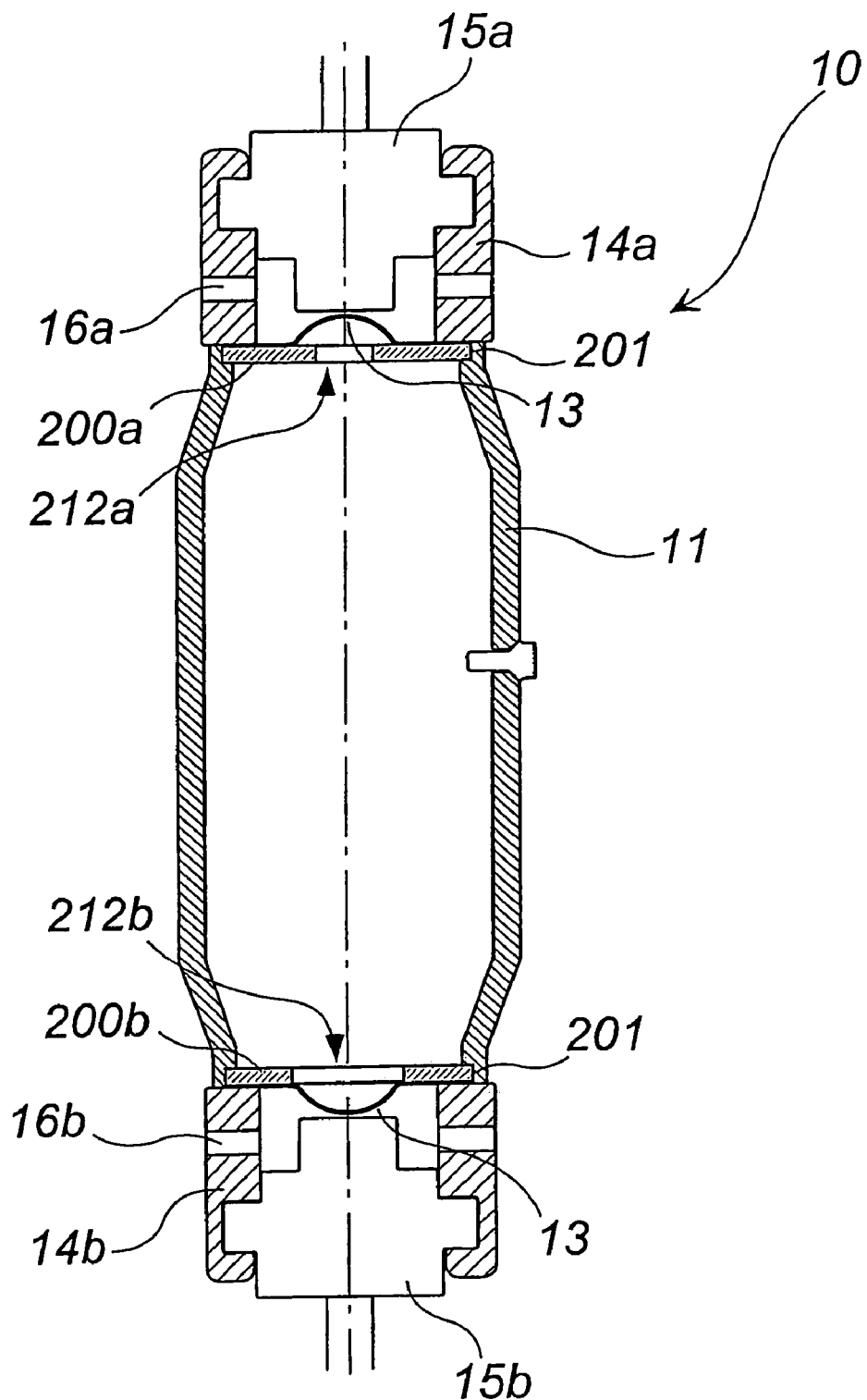
FIG. 6 is a sectional view showing still another aspect of an inflator.
Figure 7:
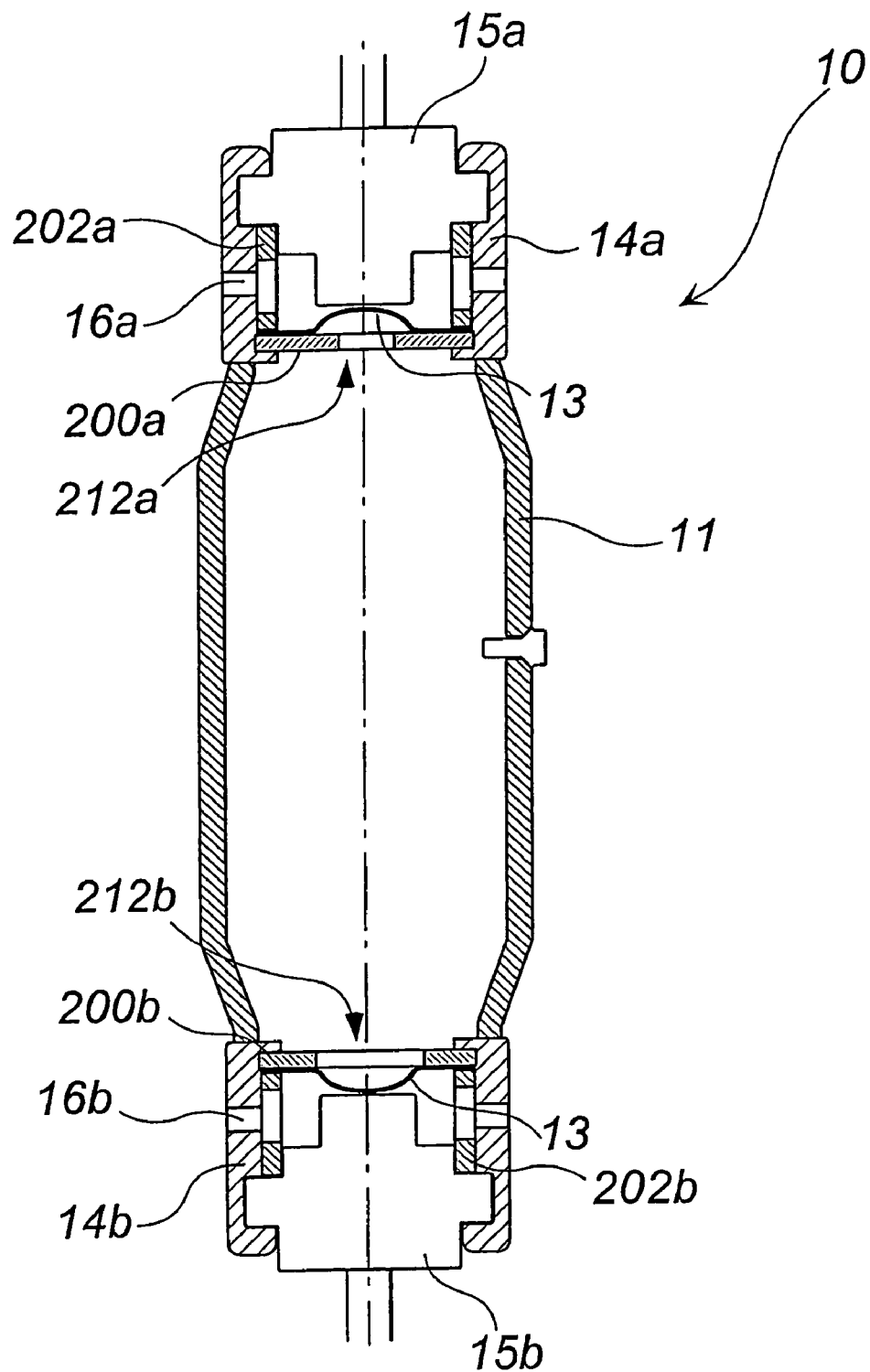
FIG. 7 is a sectional view showing still another aspect of an inflator.

Further, as shown in this embodiment, when the opening areas of the opening portions 112a and 112b are made different from each other, as shown in FIG. 6 and FIG. 7, washer-like ring members 200a and 200b are each provided at axial both end portions of an inflator housing, and inner holes formed in the respective ring members can also be used as opening portions 212a and 212b.

By making the opening areas of the opening portions 212a and 212b formed in the respective ring members 200a and 200b different from each other like the opening portions 112a and 112b shown in FIG. 5, an amount of gases discharged from the respective diffuser portions 14a and 14b (in fact, the respective gas discharging ports 16a and 16b) can be adjusted optionally.

Regarding arrangement of the ring members 200a and 200b, as shown in FIG. 6, such a process can be employed that stepped portions 201 are formed at axial both end portions of a housing formed in a tubular shape and the respective ring members 200a and 200b are fitted into the step portions 201. In this case, rupturable plates 13 are arranged outside the respective ring members 200a and 200b, and the diffuser portions 14a and 14b can be arranged outside thereof. That is, in this aspect, the respective ring members and rupturable plates can be consequently sandwiched between the inflator housing and the respective diffuser portions 14a and 14b.

Furthermore, as shown in FIG. 7, the ring members 200a and 200b can be fixed inside the respective diffuser portions 14a and 14b provided at both end portions of the inflator housing. That is, the respective diffuser portions 14a and 14b in the inflator housing side are formed in inward flange-like shape, and the respective ring members 200a and 200b provided inside the diffuser portions abut on them and cylindrical porous members 202a and 202b are respectively arranged in the inner spaces of the respective diffuser portions 14a and 14b so that the respective porous members 202a and 202b can be fixed by pressing down them together with the igniters. Openings formed on the peripheral faces of the porous members 202a and 202b are in communication with the respective gas discharging ports 16a and 16b. By disposing the rupturable plate 13 outside the flange portion 100 or the ring body 200, the rupturable plate 13 and the igniter 15 become close to each other and it becomes easy to rupture the rupturable plate by actuation of the igniter 15. However, if a structure where the rupturable plate is ruptured securely is employed, the rupturable plate 13 may be disposed inside the ring body 200 or the flange portion 100 (that is, an interior of the housing 11). Further, it is possible to incorporate the partition plate 17, the hole portion 18 and the closing member 19 as shown in FIG. 3 and FIG. 4 into the inflator of the aspect as shown in FIGS. 5 to 7.

Embodiment 3

Figure 8:
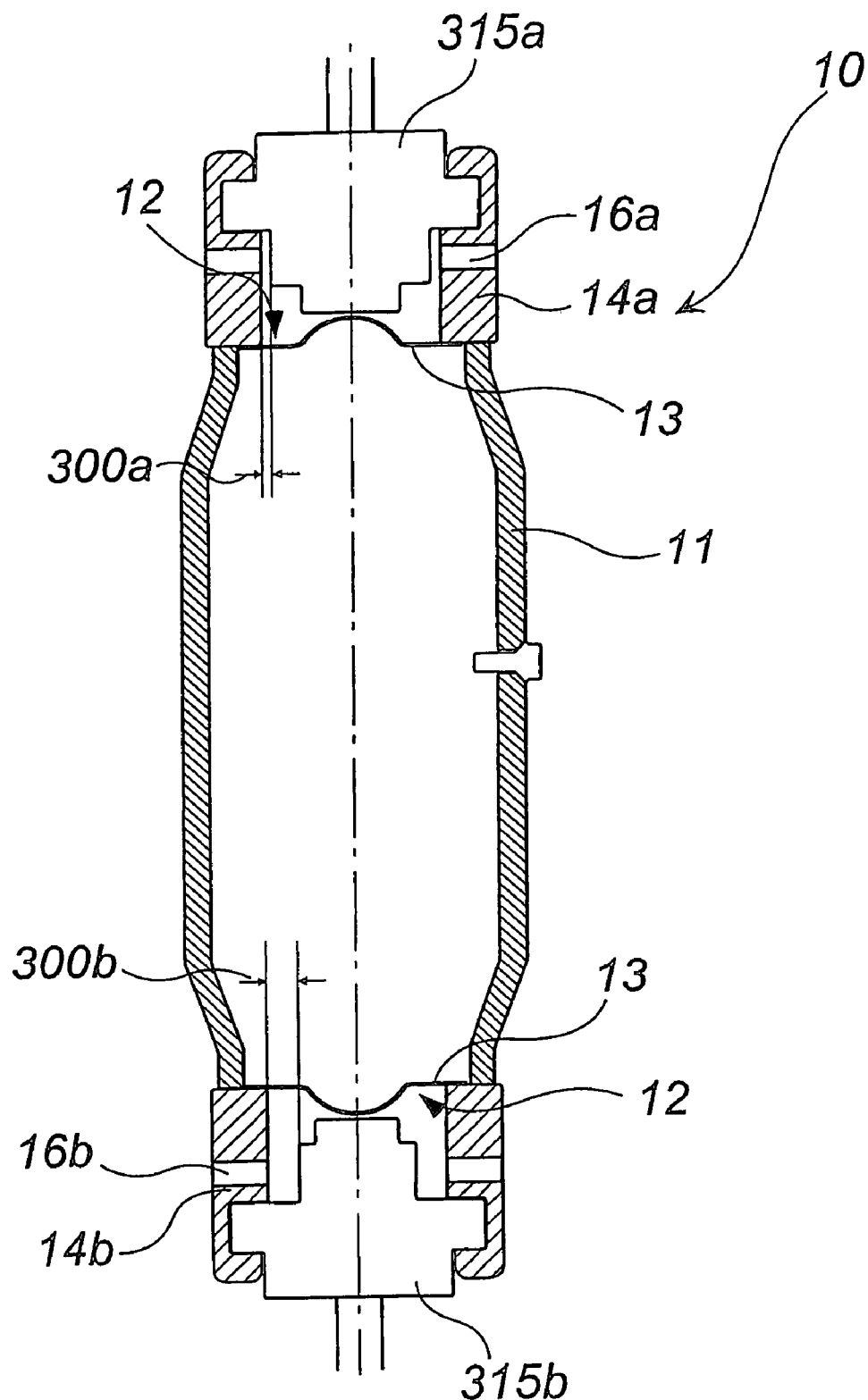
FIG. 8 is a sectional view showing still another aspect of an inflator.

An inflator for an air bag of an aspect shown in FIG. 8 is different from the inflator for an air bag shown in the above-described embodiment particularly regarding the narrow paths. Since the other portions of the former are almost the same as those of the above-described inflator, the same reference numerals are used in the drawing and explanation thereof will be omitted. Incidentally, in this embodiment, the first gas discharging ports 16a and the second gas discharging ports 16b may be the same in the diameter or the same number of the opening portions, and signs (a and b) for distinguishing the first and the second from each other are used only in view of convenience for explanation.

The inflator shown in FIG. 8 holds igniters 315a and 315b in inner spaces of respective diffuser portions 14a and 14b, and clearances 300a and 300b between peripheral faces of the respective igniters 315a and 315b and inner peripheral faces of the respective diffuser portions 14a and 14b are defined as narrow paths. In this case, then arrow path is for adjusting flow condition of gas, it needs to exist in a course from the inflator housing (more specifically, an opening portion) to the gas discharging ports. Therefore, in this aspect, the clearances 300a and 300b serving as the narrow paths are portions extending from the opening portions provided in the inflator housing to the gas discharging ports. By making the minimum diametric sectional areas of the clearances 300a and 300b (the areas of portions with the minimum diametric sectional areas of portions provided for gas communication in the inner spaces of the diffuser portions) different, the outflow amount of the pressurized medium (the outflow speed) can be adjusted.

In order to make the minimum diametrical sectional areas of the clearances 300a and 300b different, as shown in FIG. 8, besides a case that the outer diameters of the respective igniters 315a and 315b are made different and the diameters of the inner spaces of the respective diffuser portions 14a and 14b are made equal, such a constitution can be employed that, on the contrary, the outer diameters of the respective igniters 315a and 315b are made equal and the diameters of the inner spaces of the respective diffuser portions 14a and 14b are made different, or both of the outer diameters of the respective igniters 315a and 315b and the diameters of the inner spaces of the respective diffuser portions 14a and 14b are made different.

Even in the inflator shown in this embodiment, the amounts of the gases discharged from the respective diffuser portions 14a and 14b (in fact, respective gas discharging ports 16a and 16b) can be finely adjusted optionally by adjusting the activation timings of the respective igniters 315a and 315b. For this reason, when the air bag system of the present invention is formed using the inflator, inflation timings and inflation conditions of the respective air bag chambers 20a and 20b can be adjusted optionally. In this embodiment, it is also possible to combine the partition plate 17, the hole portion 18 and the closing member 19 as shown in FIG. 3 and FIG. 4.

Figure 9:
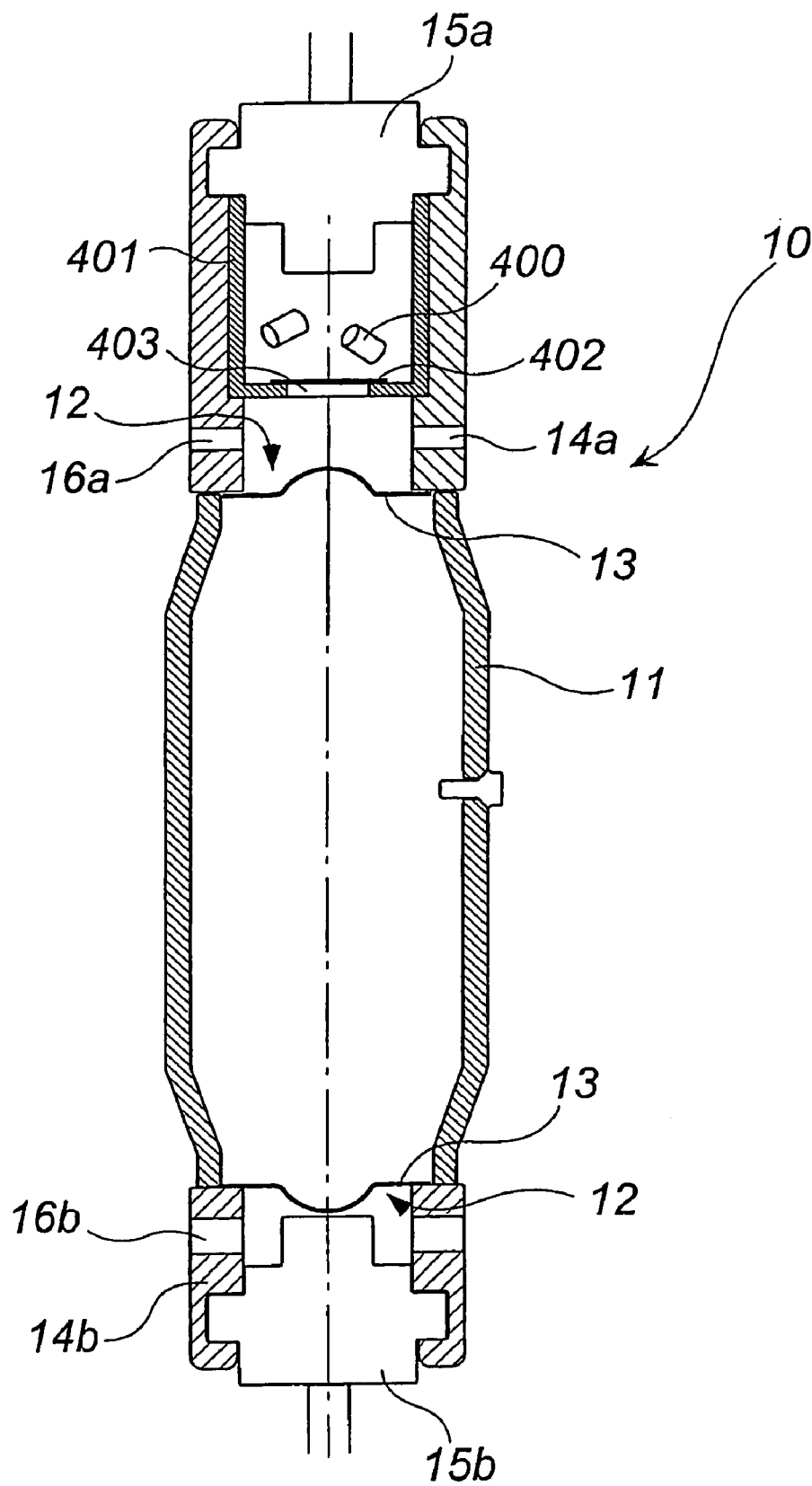
FIG. 9 is a sectional view showing still another aspect of an inflator.

Further, FIG. 9 shows an embodiment where a gas generating agent 400 which is ignited and burnt due to flame by activation of the igniter 15a to generate a gas is charged inside the diffuser portion. In FIG. 9, the gas generating agent 400 is charged into a cylindrical member 401 surrounding a head portion (a portion in which a priming is accommodated) of the first igniter 15a, and the cylindrical member 401 is provided in the rupturable plate 13 side with an opening 403 closed by a sealing tape 402. Incidentally, a similar cylindrical member is disposed in the second igniter 15b side, namely between the second igniter 15b and the rupturable plate 13, and such a gas generating agent 400 can also be charged into the cylindrical member.

In an inflator constituted to include the gas generating agent 400 in this manner, when the first igniter 15a is activated, the gas generating agent 400 is burnt by its flame to generate a gas, and the gas can rupture the rupturable plate 13 more securely in cooperation with an activation energy of the igniter 15a.

Incidentally, in the inflator shown in this embodiment, it is desirable to provide the partition plate 17 having the hole portion 18 with a predetermined size as shown in the above FIG. 3 or provide the partition plate 17' closed by the closing member 19' from the defined direction as shown in FIG. 4 such that the rupturable plate 13 at one end (in the drawing, the second igniter 15b side) is not ruptured by a gas generated by combustion of the gas generating agent 400 on the other end (in the drawing, the first igniter 15a side). Then, it is desirable that the hole portions 18 and 18' provided in these partition plates 17 and 17' are deviated from the centers of the respective partition plates.

Incidentally, in this embodiment, the structure where the rupturable plates 13 are mounted to both the opening portions of the housing 11 is shown, but, if rupturable plates are ruptured securely due to activation of igniters so that a desired effect can be achieved, they may be mounted from insides the gas discharging ports 14a and 14b in the diffusers 14.

Embodiment 4

FIGS. 10 and 11 show aspects of an embodiment of an inflator 410 for an air bag constituted to accompany a case portion 460.

Inflators 410 shown in the embodiments (FIGS. 10 and 11) are constituted with an inflator base portion 450 formed by accommodating a gas source in a longitudinal and cylindrical inflator housing 411 and providing ignition means 415 functioning as an activation starting device to one end side of the inflator housing 411 and the case portion 460 which is provided internally with the inflator base portion 450.

When a pressurized gas is used as a gas source, such a sealing member (not shown) as a rupturable plate is provided in the inflator base portion 450 in order to maintain an air tight state inside the inflator housing 411 before activation. Then, both the inflator base portions 450 shown in FIG. 10 and FIG. 11 are provided with a gas discharging port 416. In the inflator base portion 450 shown in FIG. 10, the gas discharging port 416 is provided on a diffuser portion 414 provided on a side opposite to a side where the ignition means 415 is provided in the inflator housing 411. And in the inflator base portion 450 shown in FIG. 11, the gas discharging port 416 is provided almost in an axial central portion of the inflator housing 411.

The inflators 410 shown in FIGS. 10 and 11 also have the tubular case portion 460 having one end opening closed, and a gas ejecting port 470 is provided on peripheral surfaces of the case portions 460 on both sides with regard to an axial direction of the case portion 460. For convenience of explanation, the gas ejecting port provided in the closed end side of the case portions 460 is defined as a first gas ejecting port 470*a*, and the gas discharging port provided on the other side (in the opened end portion side) is defined as a second gas ejecting port 470*b*. The total opening areas of the first and second gas ejecting ports 470 are different from each other, and in the present embodiment, the second gas ejecting port 470*b* is formed to be larger in total opening area than the first gas ejecting port 470*a*. Incidentally, besides a case when each gas ejecting port 470 is formed as one opening, it can be formed as many openings unevenly existing in one portion or as a line of openings arranged in a circumferential direction to make a round at equal intervals.

A gas flowing space 480 for guiding a gas discharged from the gas discharging ports 416 to the gas ejecting ports is secured inside the case portion 460 between an outer peripheral surface of the inflator base portion 450 and an inner peripheral surface of the case portion 460 in a state where the inflator base portion 450 is accommodated. In a case where both the gas ejecting ports 470*a* and 480*b* are arranged as shown in FIG. 10, the gas communication space 480 is formed larger than the total opening area of the second gas ejecting port 470*b*. At this time, the total opening area of the first gas ejecting port 470*a* is, naturally, formed smaller than an annular sectional area of the gas communication space 480. Thereby, an amount of the gas fed to the air bag can be adjusted by the gas ejecting ports 470*a* and 470*b*. However, if the first gas ejecting port 470*a* and the second gas ejecting port 470*b* are formed in a positional relationship reverse to a positional relationship shown in FIG. 10 (namely, in case that the respective gas ejecting ports are formed in a state where their sizes are reversed such that the second gas ejecting port 470*b* is provided at a portion where the first gas ejecting port 470*a* is described in FIG. 10 and the first gas ejecting port 470*a* is provided at a portion where the second gas ejecting port 470*b* is described), the total opening area of the first gas ejecting port 470*a* is formed smaller than the annular sectional area of the gas communication space 480. In this case, since there is neither a member nor a structure which interferes with flow of a gas flowed from the gas discharging port 414 to reach the first gas ejecting port 470*a*, the total opening area of the second gas ejecting port 470*b* may be larger than or smaller than the annular sectional area of the gas communication space 480.

In FIG. 11, since the annular gas flowing space 480 exists between the gas ejecting ports 470*a* and 470*b* and the gas discharging ports 416, the annular sectional area of the gas communication space 480 is formed larger than the first gas ejecting port 470*a* and the second gas ejecting port 470*b*.

Thereby, the gas communication space 480 is prevented from functioning as a narrow path for regulating a gas flow at the time of activation so that an amount of gases from the respective gas ejecting ports 470 can be adjusted by the total opening areas of the respective gas ejecting ports 470. Incidentally, it is not required that the gas communication space 480 is always formed in an annular shape, and a sectional shape of a gas flow path (namely, a sectional shape orthogonal to a flow direction of a gas) may be formed in a rectangular shape or other shapes.

The case portion 460 is fixed by crimping its opening end portion in a state that the inflator base portion 450 is internally mounted in the opening end portion, and it is particularly desirable to form a groove 481 on an outer peripheral surface of the inflator base portion 450 and crimp the opening end portion to the groove 481. In FIGS. 10 and 11, particularly, the groove 481 formed in a circumferential direction outside the inflator base portion 450, more specifically, outside a portion of the inflator housing 411 where the ignition means 415 is internally mounted, or alternatively the groove may be formed partially or to make a round intermittently on the portion. Incidentally, in order to ensure a sealed state between the case portion 460 and the inflator base portion 450, it is desirable to interpose an O-ring 490 between both. Therefore, in the inflator 410 shown in FIG. 10, the O-ring 490 is provided at a position slightly shifted to the opening end portion from the second gas ejecting port 470*b*, and in the inflator 410 shown in FIG. 11, the O-ring 490 is provided at a crimping portion of the case portion 460. Incidentally, in the inflator base portion 450 shown in FIG. 11, the gas discharging ports 416 exist almost at the central portion in the axial direction of the housing 411, but such a constitution can be employed that the gas discharging ports 416 are formed to deviate from the central portion or over the entire peripheral surface of the housing 411.

Next, activation states of the inflators 410 shown in the respective figures will be explained. In the inflator 410 shown in FIG. 10, the inflator base portion 450 is actuated due to activation of the ignition means 415 so that a gas inside the inflator housing 411 is discharged in the radial direction from the gas discharging ports 416 of the diffuser portion 414 provided in the end portion in the axial direction thereof. Then, the gas collides on an inner wall of the case portion 460 so that its direction is changed and the gas is guided through the gas communication space 480 to reach the respective gas ejecting ports 470. At that time, since the total opening area of the second gas ejecting port 470*b* is formed to be larger than the total opening area of the first gas ejecting ports 416, a large amount of a gas is discharged from the second gas ejecting port 470*b* preferentially.

On the other hand, in the inflator 410 shown in FIG. 11, the inflator base portion 450 is activated due to activation of the ignition means 415 so that the gas inside the inflator housing 411 is discharged in the radial direction from the gas discharging ports 416 existing at the central portion of the housing. Then, the gas collides on an inner wall of the case portion 460 so that its direction is changed and the gas is guided through the gas communication space 480 to reach the respective gas ejecting ports 470. At that time, since the total opening area of the second gas ejecting port 470*b* is formed larger than the total opening area of the first gas ejecting ports 416, a large amount of a gas is discharged preferentially.

Accordingly, in both inflators 410 shown in FIG. 10 and FIG. 11, it is also possible to inflate the air bag or the air bag portion connected to the second gas ejecting port 470*b* preferentially. Therefore, the inflators 410 shown in these aspects can also be used suitably in such an air bag system as the above FIG. 2.

Figure 12:
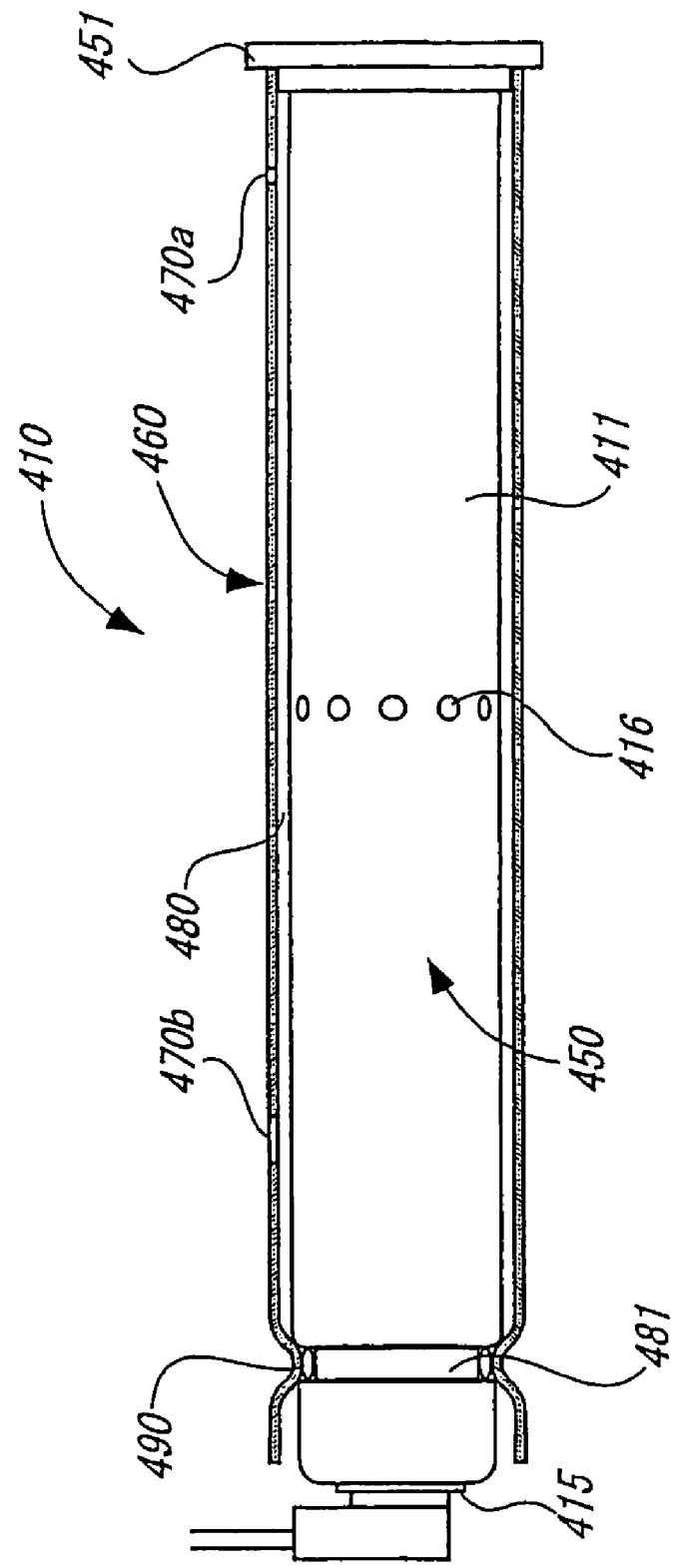
FIG. 12 is a sectional view showing still another aspect of an inflator.

Further, as shown in FIG. 12, the inflator of the present invention can be constituted by forming the case portion in a cylindrical shape and fitting both end openings thereof on an outer peripheral surface of the inflator housing. In this drawing, in an inflator base portion 450, an ignition means 415 is mounted in one end of the inflator housing 411, a flange-like end portion boss 451 is provided in the other end to close the inflator housing 411. A peripheral surface of the end portion boss 451 is formed by providing a notch in a stepped shape in a circumferential direction, and the case portion formed in a cylindrical shape is fitted on the stepped portion. Since the stepped portion of the peripheral surface of the end portion boss 451 is formed larger in outer diameter than the peripheral surface of the inflator housing, an annular gas communication space 480 is consequently secured between the inflator housing 411 and the case portion 460. The inflator shown in FIG. 12 can operate in the same manner as the inflator shown in FIG. 11.

What is claimed is:

1. An inflator for an air bag, comprising:
a tubular inflator housing provided at both end portions thereof with opening portions;
diffuser portions mounted at said both end portions and provided with a gas discharging port for discharging pressurized medium flowing out from the opening portions into an air bag;
rupturable plates which close either one of the opening portions or the gas discharging port to seal off the pressurized medium inside; and
igniters provided to rupture each of the rupturable plates,
wherein narrow paths for regulating respective flow amounts of the pressurized medium are provided at said both end portions of the inflator housing, and
a first gas flow path sectional area of one of the narrow paths and a second gas flow path sectional area of the other of the narrow paths are different from each other,
wherein one of the two diffuser portions mounted at the both end portions of the inflator housing is connected to an air bag or air bag portion existing in the vicinity of an upper lateral part of a passenger, and the other diffuser portion is connected to another air bag or another air bag portion existing in the vicinity of a lower lateral part of the passenger, and
the first gas flow path sectional area of the narrow path formed at the diffuser portion connected to the air bag or the air bag portion existing in the vicinity of the upper lateral part of the passenger is formed to be smaller than the second gas flow path sectional area of the narrow path formed at the diffuser portion connected to the air bag or the air bag portion existing in the vicinity of the lower lateral part of the passenger.

2. An inflator for an air bag according to claim 1, wherein the narrow paths are a plurality of gas discharging ports formed in the respective diffuser portions, and
a total opening area of gas discharging ports formed in one of the diffuser portions is different from a total opening area of gas discharging ports formed in the other of the diffuser portions.

3. An inflator for an air bag according to claim 1, wherein the narrow paths are opening portions provided at said both end portions of the inflator housing, and
an opening area of the opening portion formed at one of the end portions of the inflator housing is different from an opening area formed at the other of the end portions of the inflator housing.

4. An inflator for an air bag according to claim 1, wherein the diffuser portions include igniters which rupture the respective rupturable plates,
the narrow paths are clearances leading to the gas discharging port and formed between inner faces of the diffuser portions and outer peripheral surfaces of the igniters, and
the minimum diametrical sectional area of the clearance between the inner peripheral surface of one of the diffuser portions and the outer peripheral surface of a corresponding igniter is different from the minimum diametrical sectional area of the clearance between the inner peripheral surface of the other diffuser portion and the outer peripheral surface of the other igniter.

5. An inflator for an air bag according to claim 1, wherein a partition plate extending in a diametrical direction is disposed in the interior of the inflator housing, and a hole portion is provided in the partition plate and has a flow path sectional area of a gas which is smaller than the gas flow path sectional area of narrower of the narrow paths.

6. An inflator for an air bag according to claim 1, wherein a partition plate extending in a diametrical direction is disposed in the interior of the inflator housing, and a hole portion is provided in the partition plate, the hole portion is closed by a closing member attached to a side in which the larger of the narrow paths is provided.

7. An air bag system, comprising:
an air bag having a first gas introducing port and a second gas introducing port; and
the inflator according to claim 1,
wherein, each of the diffuser portions is connected to different gas introducing ports.

8. An air bag system according to claim 7, wherein an inner space of the air bag is partitioned into a space connected to the first gas introducing port and a space connected to the second gas introducing port, and the spaces are in communication with each other.

9. An air bag system, comprising:
a plurality of air bags; and
the inflator for an air bag according to claim 1, wherein different air bags of the plural air bags are mounted to respective diffuser portions provided to the inflator.

10. An inflator for an air bag, comprising:
a tubular inflator housing provided at both end portions thereof with opening portions;
diffuser portions mounted at said both end portions and provided with a gas discharging port for discharging pressurized medium flowing out from the opening portions into an air bag;
rupturable plates which close either one of the opening portions or the gas discharging port to seal off the pressurized medium inside; and
igniters provided to rupture each of the rupturable plates,
wherein narrow paths for regulating respective flow amounts of the pressurized medium are provided at said both end portions of the inflator housing, and a first gas flow path sectional area of one of the narrow paths and a second gas flow path sectional area of the other of the narrow paths are different from each other, wherein one of the two diffuser portions mounted at both end portions of the inflator housing is connected to an air bag or air bag portion existing in the vicinity of an upper lateral part of a passenger, and the other diffuser portion is connected to another air bag or another air bag portion existing in the vicinity of a lower lateral part of the passenger, and the first gas flow path sectional area of the narrow path formed at the diffuser portion connected to the air bag or the air bag portion existing in the vicinity of the upper lateral part of the passenger is formed larger than the second gas flow path sectional area of the narrow path formed at the diffuser portion connected to the air bag or the air bag portion existing in the vicinity of the lower lateral part of the passenger.

11. An inflator for an air bag according to claim 10, wherein the narrow paths are a plurality of gas discharging ports formed in the respective diffuser portions, and a total opening area of gas discharging ports formed in one of the diffuser portions is different from a total opening area of gas discharging ports formed in the other of the diffuser portions.

12. An inflator for an air bag according to claim 10, wherein the narrow paths are opening portions provided at said both end portions of the inflator housing, and an opening area of the opening portion formed at one of the end portions of the inflator housing is different from an opening area formed at the other of the end portions of the inflator housing.

13. An inflator for an air bag according to claim 10, wherein the diffuser portions include igniters which rupture the respective rupturable plates, the narrow paths are clearances leading to the gas discharging port and formed between inner faces of the diffuser portions and outer peripheral surfaces of the igniters, and the minimum diametrical sectional area of the clearance between the inner peripheral surface of one of the diffuser portions and the outer peripheral surface of a corresponding igniter is different from the minimum diametrical sectional area of the clearance between the inner peripheral surface of the other diffuser portion and the outer peripheral surface of the other igniter.

14. An inflator for an air bag according to claim 10, wherein a partition plate extending in a diametrical direction is disposed in the interior of the inflator housing, and a hole portion is provided in the partition plate and has a flow path sectional area of a gas which is smaller than the gas flow path sectional area of narrower of the narrow paths.

15. An inflator for an air bag according to claim 10, wherein a partition plate extending in a diametrical direction is disposed in the interior of the inflator housing, and a hole portion is provided in the partition plate, the hole portion is closed by a closing member attached to a side in which the larger of the narrow paths is provided.

16. An air bag system, comprising:

an air bag having a first gas introducing port and a second gas introducing port; and the inflator according to claim 10, wherein, each of the diffuser portions is connected to different gas introducing ports.

17. An air bag system according to claim 16, wherein an inner space of the air bag is partitioned into a space connected to the first gas introducing port and a space connected to the second gas introducing port, and the spaces are in communication with each other.

18. An air bag system, comprising:

a plurality of air bags; and the inflator for an air bag according to claim 10, wherein different air bags of the plural air bags are mounted to respective diffuser portions provided to the inflator.

* * * * *